(12) United States Patent
Shiohara

(10) Patent No.: US 9,787,925 B2
(45) Date of Patent: Oct. 10, 2017

(54) IMAGING DEVICE WITH REDUCED DELAY IN DISPLAY

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/041,363

(22) Filed: Feb. 11, 2016

(65) Prior Publication Data

US 2016/0261815 A1 Sep. 8, 2016

(30) Foreign Application Priority Data

Mar. 6, 2015 (JP) .................................. 2015-044366

(51) Int. Cl.
| | |
|---|---|
| *H04N 5/222* | (2006.01) |
| *H04N 5/376* | (2011.01) |
| *G09G 5/12* | (2006.01) |
| *H04N 5/232* | (2006.01) |
| *G09G 5/18* | (2006.01) |

(52) U.S. Cl.
CPC ............. *H04N 5/3765* (2013.01); *G09G 5/12* (2013.01); *H04N 5/23293* (2013.01); *G09G 5/18* (2013.01); *G09G 2340/0435* (2013.01)

(58) Field of Classification Search
CPC .......................... G09G 5/12; G09G 2340/0435
See application file for complete search history.

(56) References Cited

U.S. PATENT DOCUMENTS

| | | | |
|---|---|---|---|
| 9,218,787 B2* | 12/2015 | Shiohara .................. | G09G 5/12 |
| 2008/0079814 A1* | 4/2008 | Nobuoka ............... | H04N 3/155 |
| | | | 348/208.99 |
| 2011/0285734 A1 | 11/2011 | Shiohara | |
| 2014/0192231 A1 | 7/2014 | Gunji et al. | |
| 2015/0042860 A1 | 2/2015 | Shiohara et al. | |

FOREIGN PATENT DOCUMENTS

| | | |
|---|---|---|
| JP | 2010-268388 A | 11/2010 |
| JP | 2011-211507 A | 10/2011 |
| JP | 2011-244170 A | 12/2011 |
| JP | 2013-225923 A | 10/2013 |
| JP | 2014-154909 A | 8/2014 |
| WO | 2008/038831 A1 | 4/2008 |

OTHER PUBLICATIONS

The Extended European Search Report for the corresponding European Application No. 16153660.2 dated May 19, 2016.

* cited by examiner

*Primary Examiner* — Gary C Vieaux
(74) *Attorney, Agent, or Firm* — Global IP Counselors, LLP

(57) ABSTRACT

An imaging device including an image sensor; an image data generation portion that generates image data on the basis of output data from the image sensor; a display portion that displays the image data within a display scanning period in a display cycle that is N times the sensor cycle (N>=2); and a display control portion that, when a partial image constituting the image and corresponding to a predetermined one of the lines forming the image has become ready for display on the basis of partial image data constituting the image data and representing the partial image, performs control of causing the display portion to start display of partial images constituting the image and corresponding to one frame, at a rate of once every N iterations of the imaging operation by the image sensor.

6 Claims, 5 Drawing Sheets

IMAGING DEVICE WITH REDUCED DELAY IN DISPLAY

BACKGROUND

1. Technical Field

The present invention relates to an imaging device that displays an image on a display portion incorporated therein.

2. Related Art

Nowadays, there are increasing needs for imaging devices capable of performing imaging operations at intervals of a short cycle (120 frames per second (fps), 240 fps, or the like) for the purpose of realization of a high speed AF operation, smoothness of a video image, a high frame resolution camera carried in a vehicle, and the like. Meanwhile, in such an imaging device, when imaging operations are performed at intervals of a short cycle and display processes are also performed at intervals of a short cycle, a transmission bandwidth is excessively required, and electric power is excessively consumed. Accordingly, there have been developed imaging devices that are configured such that the driving cycle of an image sensor incorporated therein becomes shorter than the driving cycle of a display portion incorporated therein. For example, JP-A-2010-268388 describes a configuration in which a display portion is driven at intervals of a cycle that is an integer times the driving cycle of an image sensor and a display delay $\Delta t$ in the display portion is constant.

In a related technique, in order to properly display an image with a constant display delay $\Delta t$, preparation for displaying an image (imaging operation and image processing subsequent to the imaging operation) has to be completed before the image is displayed on the display portion. Accordingly, in order to ensure the completion of the preparation for the displaying, it is required to set a large value including a sufficient margin as the display delay $\Delta t$ so that the displaying does not precede the preparation. Accordingly, even when the preparation for the displaying is completed before the displaying, since the predetermined delay $\Delta t$ is provided, it is difficult to minimize display delay.

SUMMARY

An advantage of some aspects of the invention is to provide an imaging device that can reduce a delay in displaying an object image on a display portion thereof.

According to an aspect of the invention, a display portion displays an image represented by image data within a display scanning period (a second display scanning period) whose length is shorter than the length of a display scanning period (a first scanning period) during which the display portion performs a display process on each of lines existing between a display start line and a display end line and forming the image, and which is provided for a display cycle that is N times a sensor cycle of an image sensor (N being an integer larger than or equal to "2"). Further, when a partial image constituting the image and corresponding to a predetermined one of the lines has become ready for being displayed, a display control portion performs control of causing the display portion to start display of partial images constituting the image and corresponding to one frame, at a rate of once every N iterations of an imaging operation by the image sensor.

That is, the display control portion causes the display portion to start display of partial images corresponding to one frame when a partial image corresponding to a predetermined one of the lines forming the image has become ready for being displayed. Through this configuration, as a result, in the display portion, when the partial image corresponding to the relevant predetermined line has become ready for being displayed, the display of the partial images corresponding to one frame is immediately started from display of a partial image corresponding to a first one of the lines. Thus, even when the length of a period until the partial image corresponding to the relevant predetermined line becomes ready for being displayed has become longer than in a normal case because of an incidental cause or the like, the display portion waits until the partial image corresponding the relevant predetermined line has become ready for being displayed, but upon completion of preparation for display of the partial image corresponding to the relevant predetermined line, the display portion starts the display without any delay. Thus, for at least the predetermined line, no matter what kind of processing for generating image data is performed before the completion of preparation for display, and how a delay occurs, upon completion of the preparation for display for the relevant predetermined line, the display is started. Accordingly, for at least the predetermined line, a time lag from the completion of the preparation for display until the start of the display is minimized. As a result, as compared with the configuration in which the display is started after an elapse of a time equal to the display delay $\Delta t$ having a large amount including a sufficient margin, the above configuration makes it possible to make the delay in display of an object by the display portion smaller.

Further, in general, since, when the imaging operations by the image sensor and the display operations by the display portion are continuously performed in a state of being not synchronized with each other (that is, in a state in which a display cycle is not N times the sensor cycle), the amount of the display delay becomes unstable and thereby images on the display portion become unnatural, it is preferable that the amount of the display delay is stable in a state in which the imaging operations and the display operations are synchronized with each other. When it is assumed that the display cycle is made equal to N times the sensor cycle, however, in the case where, in order to drive the display portion at intervals of the relevant display cycle, the lengths of a back porch, the display scanning period (the first display scanning period), and a front porch are set to respective predetermined lengths, there is not a temporal margin enough to wait for a display start timing point that is delayed in conjunction with an incidental delay in preparation for display. Accordingly, in order to perform the display without any failure, it has been required a method in which, for example, like the above-described conventional technology, a constant display delay $\Delta t$ is provided and this display delay $\Delta t$ is set to a large value including a margin enough to cause the incidental delay in preparation for display not to exceed the display delay $\Delta t$, that is, a margin enough to ensure the fully completion of the processing for generating image data.

The display control portion is configured to, however, perform a display process on each of lines existing between a display start line and a display end line and forming the image, during the display scanning period (the second display scanning period) whose length is shorter than the length of the display scanning period (the first display scanning period) for the display cycle that is N times the sensor cycle. Thus, even when the lengths of the back porch and the front porch are set to respective predetermined lengths (respective predetermined lengths for the display cycle that is N times the sensor cycle, or respective predetermined lengths for a display cycle that is shorter than the relevant display cycle), the sum of the lengths of the back porch, the display scanning period, and the front porch becomes shorter than the length of the display cycle that is N times the sensor cycle. That is, when a difference between the sum of the lengths and the length of the display cycle that is N times the sensor cycle is denoted by ΔM, a margin ΔM equal to this difference ΔM can be provided.

Further, as described above, the display control portion causes the display portion capable of bringing about the margin ΔM to start display of partial images corresponding to one frame when a partial image corresponding to a predetermined one of the lines forming the image has become ready for being displayed. In this configuration, there is a case where the processing for generating image data representing the partial image corresponding to the relevant predetermined line is delayed due to an incidental cause or the like, thereby causing a delay in the start of display of the image in the display portion (for example, there is a case where the start of the display is delayed behind a start of the display, that is made in a state in which the processing for generating the image data is performed at a minimal processing speed or an average processing speed), but it is possible to cause the margin ΔM to absorb the delay in the start of the image. For example, when a delay in preparation for display has occurred before the start of the display in the display portion and the amount of the delay is within the margin ΔM, the relevant delay in preparation for display can be absorbed in the course in which the display portion performs the display processes during one display cycle. Further, even when the amount of the delay is larger than the margin ΔM, the relevant delay in preparation for display can be absorbed in the course in which the display portion performs the display processes during a plurality of display cycles. Thus, even when a delay in preparation for display has temporarily occurred, the delay is gradually reduced and is finally eliminated during a plurality of display cycles that is an instantaneous period in actual feeling.

As described above, since even when a delay in display is not be able to be absorbed during one display cycle, the delay in display is able to be absorbed after an elapse of the plurality of display cycles, it is unnecessary to set the margin ΔM to an excessively large time and it is enough just to set it to a small time (for example, several milliseconds). Thus, an excessively short period is unnecessary to be set as the display scanning period (the second scanning period) whose length is shorter than that of the display scanning period (the first display scanning period) for the display cycle that is N times the sensor cycle, and through a setting of the margin ΔM to a small time, it is possible to drive the display portion at a low speed and thereby suppress the increase of electric power consumed by the display portion.

In such a configuration in which the margin ΔM is set to a small time, since N is an integer larger than or equal to "2", as a result, the image sensor is driven at a speed that is nearly equal to, or larger than, twice the driving speed of the display portion, and thus, the image sensor is driven at a speed sufficiently higher than the driving speed of the display portion. Such a configuration in which the image sensor is driven at a higher speed than the display portion, that is, a configuration in which the display portion displays the image within the display scanning period (the second scanning period) whose length is shorter than that of the display scanning period (the first display scanning period) for the display cycle that is N times the sensor cycle, and is longer than the length of a display scanning period (a third display scanning period) for a display cycle that is (N−1) times the sensor cycle, makes it possible to allow any generation of image data to precede display based on the generated image data. More specifically, in general, processing for generating image data corresponding to all display lines is configured so as to be completed within the sensor cycle of the image sensor (in order to make it possible to display moving images that are captured by the image sensor at intervals of the sensor cycle). Thus, in such a configuration in which the image sensor is driven at a higher speed than the display portion, the image processing on the all lines is also completed within a period whose length is nearly equal to the sensor cycle of the image sensor.

Accordingly, in the configuration in which the image sensor is driven at a higher speed than the display portion, the display speed of the display portion is significantly lower than a speed at which preparation for display for each of the lines is completed. Accordingly, as far as any delay that is caused by an incidental cause or the like and that exceptionally continues for a long time does not occur in preparation for display, in most cases, the preparation for display for each line precedes display for the each line, thus enabling display for each line to be performed in a state in which preparation for the display for the each line is completed. Further, the degree of the precedence of preparation for display for a noticed line increases as the noticed line comes near the display end line. Thus, a reserve capacity for absorbing a delay in preparation for display at a noticed time point increases as the time point comes near the end of the display cycle, and through a combination of such a configuration with the configuration in which the display portion performs the display processes during the display scanning period (the second display scanning period) whose length is shorter than that of the display scanning period (the first display scanning period) for the display cycle that is N times the sensor cycle, it is possible to provide an imaging device capable of bringing about a very large reserve capacity that sufficiently absorbs the delay in preparation for display.

In addition, a stable state in which a delay in preparation for display due to an incidental cause is not excessive and a reserve capacity for absorbing a delay in preparation for display (i.e., a reserve capacity brought about by both of the margin ΔM and a difference between the driving speed of the image sensor and that of the display portion) is able to absorb the delay in preparation for display leads to a state in which the display cycle of display based on image data by the display portion is synchronized with a period whose length is N times the sensor cycle. That is, when the image processing is stably performed in a state in which a delay in preparation for display due to an incidental cause is not excessive, an average length of a period that is required for execution of image processing on one of the lines becomes constant. Accordingly, a timing point at which display of a partial image corresponding to a predetermined one of the lines becomes ready for being displayed is synchronized with a specific timing point during the sensor cycle.

Further, the display control portion performs control of causing the display portion to start display of the image corresponding to one frame by being triggered by the completion of preparation for display of a partial image corresponding to the relevant predetermined line, at a rate of once every N iterations of the imaging operation by the image sensor. Thus, in a state in which the image processing is stably performed, the display portion displays the image in synchronization with the specific timing point, at a rate of once every N iterations of the sensor cycle. As a result, the display cycle of the display based on image data by the display portion is synchronized with a period whose length is N times the sensor cycle.

Here, the image sensor is sufficient, provided that it is capable of performing imaging operations at intervals of a predetermined sensor cycle, and it is possible to configure the image sensor by using, for example, an area image sensor that outputs output data representing an image of an object. Further, the image data generation portion is sufficient, provided that it is capable of generating image data on the basis of the output data from the image sensor. It is possible to configure the processing for the generation of image data by using any kind of image processing, and the length of a period required to complete the processing may vary in accordance with attributes of the output data output from the image sensor, modes of the imaging device, image capturing conditions, and the like. No matter how the image data generation portion is configured, the image data generation portion is sufficient, provided that, as a result of execution of the image processing, pieces of image data each representing a partial image associated with a corresponding one of the lines forming the image are generated, and the generated pieces of image data enable display of an image representing an object on the display portion.

The display portion is sufficient, provided that it is capable of displaying an image represented by image data within the display scanning period (the second display scanning period) whose length is shorter than that of the display scanning period (the first display scanning period) during which the display process on each of lines existing between a display start line and a display end line and forming the image is performed and which is provided for the display cycle that is N times the sensor cycle. That is, in the display portion in which a moving image is displayed by sequentially overwriting a still image corresponding to one frame at a predetermined frame rate (fps), partial images each associated with a corresponding one of the lines from a display start line to a display end line are displayed within one display cycle, and this display cycle includes a display scanning period during which display is actually performed, in addition to a back porch and a front porch that are provided in a portion anterior to the display scanning period and in a portion posterior to the display scanning period, respectively. That is, it is essential to secure the back porch having a predetermined length and the front porch having a predetermined length within a certain display cycle, and normally, a period other than the back porch and the front porch within the display cycle corresponds to the display scanning period. Further, a display period (a horizontal synchronization period) associated with each of the lines is set such that the display processes by the display portion on the lines existing between a display start line and a display end line and forming the image are completed within the display scanning period.

As described above, normally, when a display cycle of the display portion is determined, the length of a display scanning period corresponding to the display cycle is settled, and thus, the display scanning period (the second display scanning period) whose length is shorter than the display scanning period (the first scanning period) for the display cycle that is N times the sensor cycle can be also referred to as a display scanning period for a display cycle that is shorter than N times the sensor cycle. In addition, the display portion is sufficient, provided that it is capable of performing display of the image within the display scanning period for the display cycle that is shorter than N times the sensor cycle, and the lengths of the back porch and the front porch, which are provided in a portion anterior to the relevant display scanning period and a portion posterior to the relevant display scanning period, respectively, are not necessarily to be set to respective predetermined lengths. That is, in order to make it possible to allow processing by the display control portion to enable the display processes to be performed in synchronization with the display cycle that is N times the sensor cycle, in the configuration in which the display processes are performed during the display scanning period whose length is shorter than N times the sensor cycle, the length of at least one of the back porch and the front porch may be variable.

In addition, the display scanning period is sufficient, provided that the display scanning period is a period during which at least the display processes on the lines existing between a display start line and a display end line are performed, and the display scanning period may be a period obtained by adding a predetermined margin to the above period during which the display processes on the lines are performed. Examples of the predetermined margin include horizontal synchronization periods each for a corresponding one of lines that are not included in an effective display area of the display portion. The lines forming the image are sufficient, provided that each of the lines is composed of a plurality of pixels that are arranged in a direction perpendicular to a direction in which display scanning operations are performed, and these display scanning operations are operations each of which is sequentially performed in order of the lines to perform display processes on pixels belonging to a corresponding one of the lines. The display start line is a line on which a first one of the display scanning operations is performed to display a first partial image, and the display end line is a line on which a last one of the display scanning operations is performed to display a last partial image.

The display control portion is sufficient, provided that it is capable of performing control of causing the display portion to start display of partial images corresponding to one frame when a partial image corresponding to a predetermined one of the lines has become ready for being displayed based on generated image data, at a rate of once every N iterations of the imaging operation by the image sensor. That is, the display control portion is sufficient, provided that it is capable of controlling the display portion so as to cause the display cycle of the display portion to become synchronized with a timing point of the completion of preparation for display for a predetermined one of the lines (so as to, in a state in which a display delay occurs, cause the display cycle of the display portion to gradually become synchronized therewith) by causing the display portion to start the display of partial images corresponding to one frame by being triggered by the completion of the preparation for display for the relevant predetermined line. Further, the display control portion is sufficient, provided that it is capable of suppressing the increase of power consumption by performing control of the display portion at a rate of once every N iterations of the imaging operation by the image sensor, so as to cause the display portion not to perform the display processes at an excessively high speed by causing the display cycle to become synchronized with a cycle that is larger than the sensor cycle and is N times the sensor cycle. Thus, N is sufficient provided that it is an integer larger than or equal to "2", but, naturally, N may be larger than or equal to "3", and may be determined in accordance with a specification that is required on the display portion of the imaging device.

Moreover, the predetermined line is sufficient, provided that it is set as a line for which a time lag from the generation of image data until the start of display based on the image data is minimized, and may be, for example, a display start line or any other one of the lines in the display portion.

Further, the predetermined line is sufficient, provided that it is fixed at least after the start of display, and may be variable before the start of display. In addition, in the case where the predetermined line is the display start line, as a result, the configuration becomes such that the display of partial images corresponding to one frame is started immediately after the completion of preparation for display for the display start line, and thus, the display delay is minimized.

Meanwhile, in the case where an image other than the image of an object (for example, an image that is displayed on an OSD basis), or the like, is displayed on an upper portion of the display portion (a portion corresponding to lines from a first line to an m-th line, m being an integer larger than or equal to "2"), a configuration that allows the predetermined line to be set to an (m+1)th line is preferable. That is, the image that is displayed on an OSD basis can be generated in advance in a way that does not depend on the imaging operations by the image sensor; while the image of an object, which is to be displayed in a portion corresponding to the (m+1)th line and lines subsequent thereto, becomes ready for being displayed through the imaging operation and the image processing, and thus, when the (m+1)th line is set as the predetermined line, a display delay from the completion of preparation for display of the image of an object until the execution of the display thereof can be minimized. Further, in the case where switching between a state in which the image other than the image of an object is displayed in the upper portion of the display and a state in which the image other than the image of an object is not displayed in the upper portion thereof can be made, a configuration in which the predetermined line can be switched in conjunction with the switching between the two states is preferable.

The display portion is sufficient, provided that it starts display scanning operations for display of partial images corresponding to one frame by being triggered by the completion of preparation for display of a partial image corresponding to a predetermined one of the lines, and may start the display scanning operations from any one of the lines, for which corresponding preparation for display has been completed. Thus, the display portion may start the display scanning operations from the display start line, or may start the display scanning lines from a predetermined line. In the case where, in the latter case, an m-th line is the predetermined line (m being an integer larger than or equal to "2"), the display scanning operations are started from the m-th line and, in this case, the relevant display scanning operations are performed up to an (m−1)th line before a next trigger occurs.

Various configurations can be employed as the configuration that allows the display portion to perform the display processes at a rate of once every N iterations of the imaging operation by the image sensor. Further, it is possible to employ, for example, a configuration in which imaging progress information indicating progress of the number of imaging operations having been performed by the image sensor is recorded, and the display control portion specifies one imaging operation which is among N iterations of the imaging operation and at which the display processes are to be started, on the basis of the imaging progress information. In the case where the N iterations of the imaging operation has been specified, the display control portion may enable the control of causing the display processes to be started by being triggered by the completion of preparation for display of a partial image corresponding to the predetermined line, at a rate of once every N iterations of the imaging operation by the image sensor, and in any other case, the display control portion may disable the relevant control. Progress information may be generated in accordance with the operations by the image sensor, or may be generated in accordance with progress of the image processing on the output data from the image sensor.

Moreover, a configuration in which the display portion displays the partial images represented by the image data during the display scanning period (the second scanning period) whose length is between the length of the display scanning period (the third display scanning period) for the display cycle that is (N−1) times the sensor cycle and the length of the display scanning period (the first display scanning period) for the display cycle that is N times the sensor cycle may be employed. That is, since the display control portion is configured to cause the display potion to start the display processes at a rate of once every N iterations of the imaging operation by the image sensor, in the case where the length of the display scanning period (the second display scanning period) is made shorter than the length of the display scanning period (the third display scanning period) for the display cycle that is (N−1) times the sensor cycle, a configuration that allows the display portion to start the display processes at a rate of once every (N−1) or less iterations of the imaging operation by the image sensor is more effective (that is, the relevant configuration makes it possible to minimize the number of imaging operations that are executed but are not used in the display processes, and realize the synchronization).

For example, in the case where N is equal to "3" and the display processes are performed during a display scanning period whose length is shorter than that of a display scanning period for a display cycle that is (N−1) times the sensor cycle, that is, twice the sensor cycle in this case, it is possible to employ two kinds of configurations: one being a configuration that allows the display portion to start the display processes at a rate of once every three iterations of the imaging operation by the image sensor; the other one being a configuration that allows the display portion to start the display processes at a rate of once every two iterations of the imaging operation by the image sensor. In the former case, an image resulting from the imaging operation is not displayed at a rate of twice every three iterations of the imaging operation; while, in the latter case, an image resulting from the imaging operation is not displayed at a rate of once every two iterations of the imaging operation, and as a result, the latter case is more effective. Accordingly, in the configuration in which the display portion starts the display processes at a rate of once every N iterations of the imaging operation by the image sensor, the configuration in which the display portion displays the partial images represented by the image data during the display scanning period (the second scanning period) whose length is between the length of the display scanning period (the third display scanning period) for the display cycle that is (N−1) times the sensor cycle and the length of the display scanning period (the first display scanning period) for the display cycle that is N times the sensor cycle is effective.

Moreover, the configuration may be made such that, when image data representing a partial image corresponding to the predetermined line has been generated, the display control portion outputs a vertical synchronization signal to the display portion, and in response to the vertical synchronization signal, the display portion starts display of one frame of the image. That is, a general display portion is commonly configured to start display of partial images corresponding to one frame in response to the vertical synchronization signal, and thus, when the display control portion is configured to cause the display portion to start the display of the partial images by outputting the vertical synchronization signal to the display portion, it is possible to configure the display portion by applying the common configuration thereto.

Moreover, the configuration may be made such that the display control portion acquires line progress information that indicates, for each of the lines, progress of the processing for generating image data corresponding to the relevant line, and causes the display portion to display a partial image corresponding to one of the lines, for which the completion of the processing for generating image data has been specified by the line progress information. That is, the display control portion is configured to, when processing for generating image data representing a partial image corresponding to a certain one of the lines is not yet completed, cause the display portion to enter a wait state without performing any display process on the relevant line; while, when the processing for generating the image data representing the partial image corresponding to the relevant line has been completed, the display control portion causes the display portion to start the display of the partial image corresponding the relevant line. According to this configuration, since, after the completion of preparation for display of a partial image corresponding to each of the lines, the display of the partial image corresponding to the each line is performed, this configuration makes it possible not to cause any display failure, even when a delay in preparation for display of a partial image corresponding to a certain one of the lines has occurred after the start of the display processes by the display portion, and further, the delay in the preparation for display continues for a long time.

The line progress information may be information that indirectly indicates, for any one of the lines, the completion of the processing for generating image data, or may be information that directly indicates, for any one of the lines, the completion of the processing for generating image data. Regarding the former, the line progress information can be realized by using information that indicates, for each of the lines, the completion of the processing for generating pieces of image data corresponding to the relevant line; information that indicates, for each of the lines, the completion of processing for generating a piece of image data representing a pixel that is located at an edge of the relevant line and that is subjected to the processing last; information that indicates a line number of a line that is in a state of being a target of the processing for generating pieces of image data; or the like. Regarding the latter, for example, when the processing for generating image data is constituted by a plurality of image processing steps consisting of image processing steps each of which requires a processing period that possibly varies dynamically and image processing steps each of which requires a processing period that is constant, the line progress in formation can be realized by using information indicating that all the image processing steps each of which requires a processing period that possibly varies dynamically have been completed. That is, each of the image processing steps other than the image processing steps each of which requires a processing period that possibly varies dynamically requires a processing period that is constant, and thus, in the case where, for a certain one of the lines, it is possible to specify whether or not all the image processing steps each of which requires a processing period that possibly varies dynamically have been completed, it is possible to specify, for the relevant line, a timing point at which the processing for generating image data is to be completed.

Further, there may be provided an imaging device that is configured such that it includes an image sensor that performs imaging operations at intervals of a predetermined sensor cycle; and a display portion that displays an image on the basis of output data from the image sensor and, in the display portion, a display cycle of the display of the image is N times the sensor cycle (N being an integer larger than or equal to "2") and a length of a display scanning period during which the display portion performs a display process on each of lines existing between a display start line and a display end line and forming the image is shorter than a length of a display scanning period (a first display scanning period) for the display cycle that is N times the sensor cycle. That is, when the display portion that displays the image during the display scanning period (a second display scanning period) whose length is shorter than the length of the display scanning period (the first display scanning period) for the display cycle that is N times the sensor cycle, a delay in preparation for display can be absorbed by the margin ΔM that is brought about by the relevant short display scanning period. As a result, it is possible to configure an imaging device in which the display cycle of the display of the image by the display portion is synchronized with N times the sensor cycle.

Further, there may be provided an imaging device that is configured such that it includes an image sensor that performs imaging operations at intervals of a predetermined sensor cycle; and a display portion that displays an image on the basis of output data from the image sensor and, when a predetermined operation is performed by a user, the display portion displays the image at each of intervals of a display cycle that is shorter than N times the sensor cycle (N being an integer larger than or equal to "2"), and thereafter, the display portion displays the image at each of intervals of a display cycle that is N times the sensor cycle.

That is, the delay in preparation for display occurs due to various causes, and sometimes occurs due to a specific image process, such as a distortion aberration correction, an auto-focus adjustment, or a white balance adjustment. Further, such a specific image process is likely to be executed when a user performs a specific operation. For example, the distortion aberration correction is likely to be executed when a user has performed an operation of changing a focal length by using a zoom ring of the imaging device. That is, since the degree of the distortion varies when the focal length is changed, the distortion aberration correction is made, and this execution of the distortion aberration correction causes the variation of the number of lines for use in generation of image data for one display line and, as a result, an image processing speed per line is likely to vary before and after the change of the focal length.

When the auto-focus adjustment is performed, output data from the image sensor or image data generated from the output data is acquired for execution of the auto-focus adjustment, and is used in a determination as to whether or not focusing is achieved. Thus, when the auto-focus adjustment is performed, a large portion of each of resources, such as memory-to-memory transmission bandwidth and arithmetic capacity, inside the imaging device is temporarily used. As a result, the processing for generating image data is delayed, and a delay in preparation for display is likely to occur. The same situation is likely to occur in any other image process, such as the white balance adjustment, and the delay in preparation for display is likely to occur when any one of the specific image processes is performed.

The distortion abbreviation correction is likely to be made when a user has performed an operation for instructing execution of the change of a focal length by using a focal-length change instructing portion; the auto-focus adjustment is executed when a user has performed an operation for instructing execution of a focusing operation by using a focusing operation instructing portion; and the white balance adjustment is likely to be executed when a user has rapidly performed an operation for changing a direction in which the imaging device faces. Further, even when a delay in preparation for display has occurred due to any one of these image processes, the display portion temporarily displays images at intervals of the display cycle that is shorter than N times the sensor cycle, and shortly thereafter, the delay is absorbed. Thus, when any delay in preparation for display does not occur and operation comes into a stable state thereafter, the display portion is capable of displaying images at intervals of the display cycle that is N times the sensor cycle.

Further, the above-described method that is implemented in the above imaging device according to an aspect of the invention and that allows display of partial images corresponding to one frame to be started when display of a partial image corresponding to a predetermined one of the lines has become ready for being displayed can be applied as a program or a method. Further, with respect to the above device, program, and method, there are various application cases, such as a case where any one of the above device, program, and method is realized as a single device or in a single device, or a case where any one thereof is realized in the form of utilizing common components, in a device having multiple functions.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
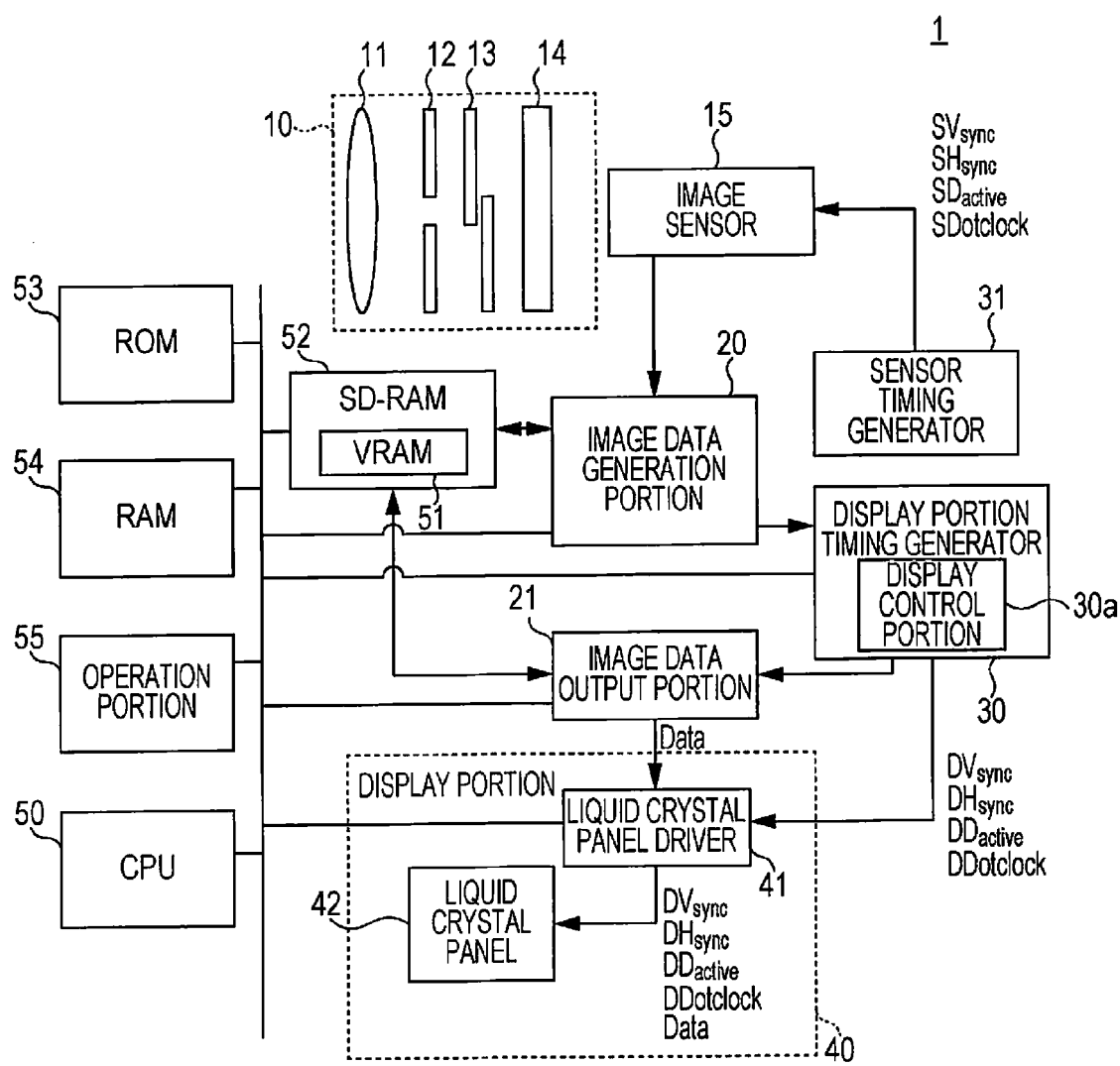
FIG. 1 is a block diagram of an imaging device according to an embodiment of the invention.

Hereinafter, embodiments of the invention will be described in accordance with the following order:
(1) Configuration of imaging device
(2) Minimization of delay
(3) Elimination of display delay
(4) Synchronization between image sensor and display portion
(5) Other embodiments
Configuration of Imaging Device FIG. 1 is a block diagram illustrating a configuration of an imaging device according to an embodiment of the invention. The imaging device 1 includes an optical system 10; an image sensor 15 (area image sensor); an image data generation portion 20; timing generators (a display portion timing generator 30 and a sensor timing generator 31); a display portion 40; a CPU 50; a VRAM 51; an SD-RAM 52; a RAM 54; and an operation portion 55. The CPU 50 is capable of executing programs recorded in the ROM 53 while utilizing the VRAM 51, the SD-RAM 52, and the RAM 54 when needed. Through the execution of the programs, the CPU performs various functions in response to users' operations on the operation portion 55, the functions including generation of image data representing an object image resulting from imaging operation by the image sensor 15; display of the object image resulting from the imaging operation; and the like. In addition, the operation portion 55 includes a shutter button; a dial switch as a mode switching means for switching among modes; a dial switch for switching among focuses; a dial switch for switching among shutter speeds; and push buttons for use in operations of various setting menus, and a user is able to give various instructions to the imaging device 1 by operating the operation portion 55.

The display portion 40 is an electronic view finder (EVF) that displays an image representing an object that is an imaging target and thereby allows a user to recognize information relating to a look of the object before an imaging operation by the user, image capturing conditions, and the like, and the imaging device 1 according to this embodiment is a mirrorless digital camera provided with the EVF. The display portion 40 includes interface circuits (not illustrated); a liquid crystal panel driver 41; a liquid crystal panel 42; an eyepiece lens (not illustrated); and the like. In this embodiment, the liquid crystal panel 42 is a high-temperature polysilicon thin film transistor (TFT) display that includes, for each of pixels, three sub-pixels each associated with a corresponding one of color filters for three colors, and the location of each of the pixels is defined by coordinates of an orthogonal coordinate system. Further, the liquid crystal panel 42 is configured such that each of a plurality of lines thereof is composed of a plurality of pixels that are arranged in a direction parallel to one of coordinate axes, and the plurality of lines are arranged in a direction parallel to the other one of the coordinate axes. In this description, a direction parallel to the plurality of lines and a direction perpendicular to the plurality of lines are referred to as a horizontal direction and a vertical direction, respectively, and one display screen composed of all of the pixels of the liquid crystal panel 42 is referred to as one frame.

The liquid crystal panel driver 41 outputs signals for supplying a voltage to each of the sub-pixels to drive a corresponding liquid crystal element, to the liquid crystal panel 42. The liquid crystal panel 42 includes a gate driver and a source driver, which are not illustrated, and performs display operation such that the gate driver controls display timing points each associated with individual pixels belonging to a corresponding one of the plurality of lines, in accordance with the signals output from the liquid crystal panel driver 41, and the source driver supplies each of the pixels belonging to a line constituting the lines and corresponding to one of the display timing points with a voltage corresponding to image data associated with the relevant pixel. That is, the liquid crystal panel driver 41 is configured to output various signals that allow the liquid crystal display 42 to perform display operation, the various signals including, for example, a vertical synchronization signal ($DV_{sync}$) that defines a period during which display processes corresponding to one frame are performed; a horizontal synchronization signal ($DH_{sync}$) that defines a period during which a display process corresponding to one line is performed; a data active signal ($DD_{active}$) that defines an image display period within one frame; a data clock signal ($DD_{otclock}$) that defines timing points, such as timing points at which each pixel is supplied with a voltage corresponding to image data associated with the each pixel; and image data (Data) associated with individual pixels.

In this regard, however, in this embodiment, the vertical synchronization signal $DV_{sync}$, the horizontal synchronization signal $DH_{sync}$, the data active signal $DD_{active}$, and the data clock signal $DD_{otclock}$, which are output from the display portion timing generator 30, are configured so as to be input to the liquid crystal panel driver 41 of the display portion 40. Thus, in each of these signals, timing points at which the voltage level of the each signal is changed depend on a corresponding one of the signals output from the display portion timing generator 30, and the display portion timing generator 30 is capable of controlling the each signal. Specifically, in this embodiment, the display portion timing generator 30 is capable of changing the start timing and the end timing of a display scanning period, during which the data active signal $DD_{active}$ is in an active state, by being informed in advance by the CPU 50 of a configuration for the change.

Moreover, the display portion timing generator 30 outputs the horizontal synchronization signals $DH_{sync}$ corresponding to all of the plurality of lines, which are arranged in the vertical direction in the liquid crystal panel 42, during a period when the data active signal $DD_{active}$ is in an active state so that a display process on each of the all lines, which exist between a first line (a display start line) and a last line (a display end line), can be performed. The liquid crystal panel driver 41 of the display portion 40 outputs the horizontal synchronization signals $DH_{sync}$ to the liquid crystal panel 42 during a period when the data active signal $DD_{active}$ is in an active state, and while being synchronized with each of the horizontal synchronization signals $DH_{sync}$, the liquid crystal panel 42 acquires the image data Data associated with each of pixels belonging to a corresponding one of the all lines, and displays a partial image corresponding to the relevant line.

In addition, as described above, the imaging device 1 includes the display portion timing generator 30, and the vertical synchronization signal $DV_{sync}$, the horizontal synchronization signal $DH_{sync}$, the data active signal $DD_{active}$, and the data clock signal $DD_{otclock}$ are generated by the relevant display portion timing generator 30. That is, the display portion timing generator 30 includes a display control portion 30a provided with a frequency divider circuit that generates signals each having a signal level that changes in synchronization with one of timing points at which the signal level of a clock signal that has a predetermined cycle and that is output from a clock signal generation means. Further, under control of the display control portion 30a, the display portion timing generator 30 outputs the vertical synchronization signal $DV_{sync}$ in accordance with line progress information (the details thereof being described below) relating to the first one of the all lines forming the image on the liquid crystal panel 42, and then cause the data active signal $DD_{active}$ to be in an active state during a display scanning period that is provided for a display cycle of 1/70 seconds and that has a length shorter than the length of a display scanning period for a display cycle of 1/60 seconds (which is twice the sensor cycle of the image sensor 15). Moreover, in this embodiment, the timing points of the outputs of the horizontal synchronization signals $DH_{sync}$ are variable, and are determined in a way that depends on the line progress information and that will be described below. In addition, here, the display cycle means a cycle of the occurrences of the vertical synchronization signal $DV_{sync}$. In general, the display cycle is composed of a front porch having a predetermined length; a back porch having a predetermined length; and a display scanning period, and thus, a period resulting from excluding the front porch and the back porch from a certain display cycle corresponds to the display scanning period for the relevant display cycle. Accordingly, when the configuration is made such that a display scanning period for the display cycle of 1/70 seconds is employed; the front porch and the back porch, each having a predetermined length, are secured; and the vertical synchronization signal $DV_{sync}$ for the display cycle of 1/60 seconds can be output, as a result, the display portion 40 is driven during a display scanning period whose length is shorter than that of the display scanning period for the display cycle of 1/60 seconds. In addition, in this embodiment, each of the front porch and the back porch has a predetermined length for the display cycle of 1/70 seconds, but may have a predetermined length for the display cycle of 1/60 seconds.

Figure 2:
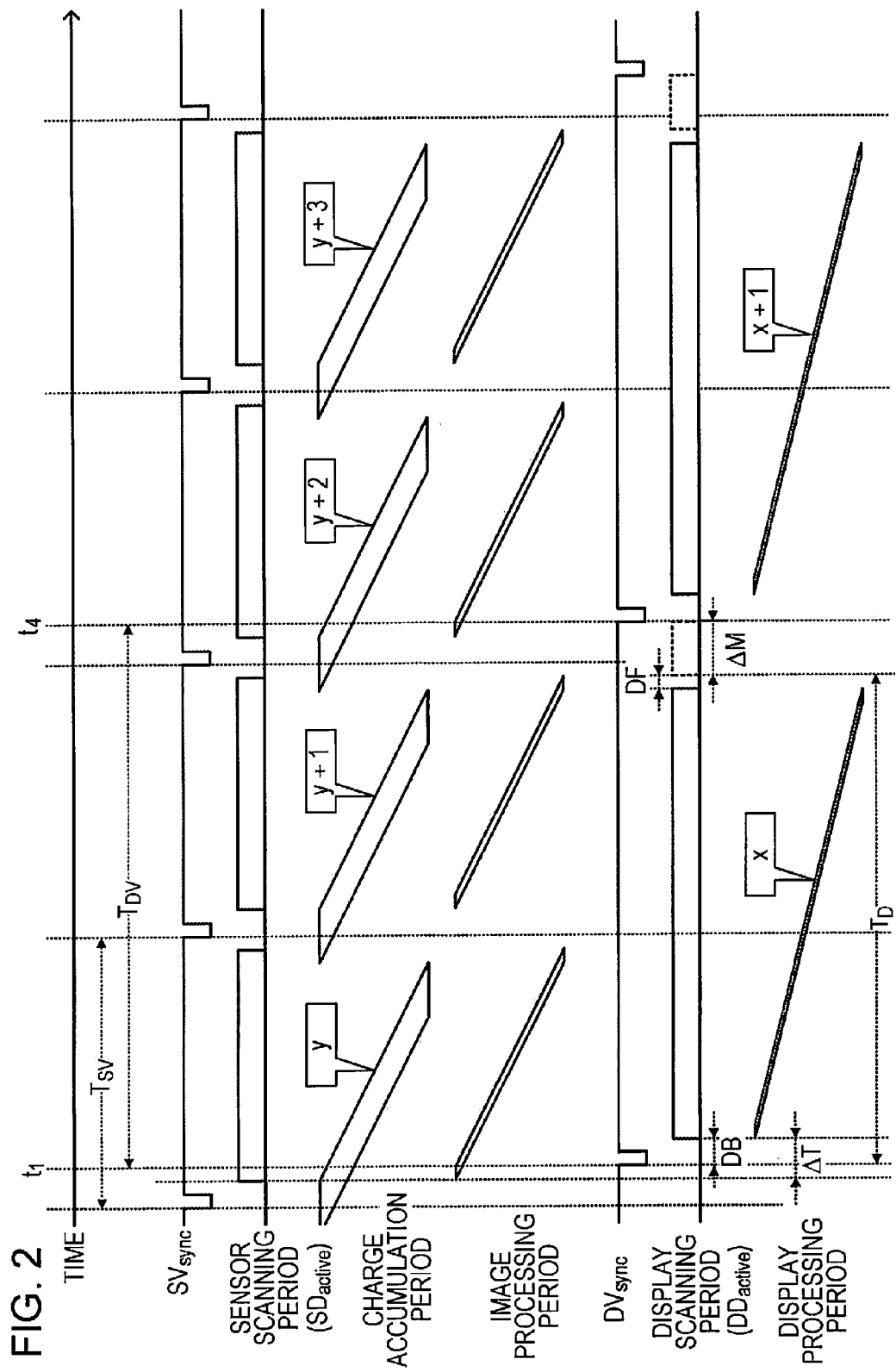
FIG. 2 is a timing chart of signals.

FIG. 2 is a diagram illustrating the timing points of main signals, processes, and the like of this embodiment on a time-series basis. That is, in FIG. 2, the time-series changes of main signals and processes are illustrated by defining a time axis as an axis extending in a horizontal direction and arranging the main signals and the processes in a vertical direction. The vertical synchronization signal $DV_{sync}$ and the display scanning period (the data active signal $DD_{active}$) of the display portion 40 are illustrated in the lower portion of FIG. 2. In this embodiment, the display scanning period of the display portion 40 is a period whose length is determined in advance as the length of a display scanning period in the case where the display cycle is 1/70 seconds. Further, the length of a back porch DB, which is a period from the vertical synchronization signal $DV_{sync}$ until the start point of the display scanning period, is set so as to be equal to a length that is determined in advance as the length of a back porch DB in the case where the display cycle is 1/70 seconds. In contrast, in this embodiment, the length of a period from the end point of the display scanning period until the vertical synchronization signal $DV_{sync}$ is not fixed. Accordingly, as shown in FIG. 2, in the case where the length of a front porch DF is equal to a length that is determined in advance as the length of a front porch DF in the case where the display cycle is 1/70 seconds, and further, the length of a period $T_{DV}$ that is a cycle of the vertical synchronization signal $DV_{sync}$ is 1/60 seconds, the display scanning period becomes a period that is represented by a rectangle illustrated in full line in FIG. 2, and a period that is represented by a rectangle illustrated in dashed line becomes a remainder period that is neither the display scanning period nor the period of the front porch DF. In addition, in each of FIGS. 2 to 5, the period of the back porch DB and the period of the front porch DF are emphatically illustrated so as to be viewable as a length longer than the actual length of the back porch DB and a length as the actual length of the front porch DF, respectively.

In this embodiment, a liquid crystal panel including any number of pixels can be employed as the liquid crystal panel 42. In this embodiment, an object image represented by image data having been generated on the basis of output data from the image sensor 15 can be displayed within a predetermined object-image display area of the liquid crystal panel 42; while characters representing information relating to image capturing conditions and the like can be displayed within an information display area other than the object-image display area. That is, the liquid crystal panel 42 is capable of displaying characters representing information relating to image capturing conditions and the like on an on-screen-display (OSD) basis, together with an object image. In addition, the position and the size of the information display area in which display is performed on an OSD basis are variable, and the object image can be displayed in a state in which the information display area does not exist. In this embodiment, for the sake of simplification of description, a state in which the information display area does not exist will be described. Further, the liquid crystal panel 42 may include pixels other than effective pixels in a horizontal-direction area and a vertical-direction area thereof, but, in this description, for the sake of simplification, processes on the pixels other than the effective pixels are omitted from description.

The optical system 10 includes a lens 11 that forms an object image on the image sensor 15; an aperture 12; a shutter 13; and a low pass filter (infrared cut filter) 14. The lens 11 and the aperture 12 among these components are attached to a housing (not illustrated) so as to be replaceable. As the image sensor 15, there is used a solid-state image sensing device, such as a complementary metal oxide semiconductor (CMOS) image sensor including color filters that are arranged in accordance with a Bayer layout and a plurality of photodiodes each of which is provided in a corresponding one of pixels and accumulates electric charges that result from photoelectric conversion of received light and that are in accordance with an amount of the received light. The locations of the pixels included in the image sensor 15 are defined by coordinates in an orthogonal coordinate system, and the image sensor 15 is configured such that each of a plurality of lines thereof is composed of a plurality of pixels that are arranged in a direction parallel to one of coordinate axes, and the plurality of lines are arranged in a direction parallel to the other one of the coordinate axes. In this description, a direction parallel to the plurality of lines and a direction perpendicular to the plurality of lines are referred to as a horizontal direction and a vertical direction, respectively. Further, one display screen constituted by all of the pixels included in the image sensor 15 is referred to as one frame. In addition, it is assumed that the one frame includes a display screen that is not constituted by the all pixels, but is constituted by pixels from which vertical-direction thinned reading operation or horizontal-direction addition reading operation, which is called draft mode reading operation, is performed.

In this embodiment, the image sensor 15 performs operation that is synchronized with various signals output from the sensor timing generator 31. That is, the sensor timing generator 31 outputs a vertical synchronization signal ($SV_{sync}$) that defines a period during which the results of detections by the photodiodes during one frame are read out; a horizontal synchronization signal ($SH_{sync}$) that defines a period during which the results of detections by the photodiodes during one line are read out; and a data clock signal ($SD_{otclock}$) that defines timing points, such as timing points at which output data in each pixel are read out. The image sensor 15 starts the output of output data corresponding to one frame in response to one vertical synchronization signal $SV_{sync}$, and then, in response to each of horizontal synchronization signals $SH_{sync}$ that are output during one sensor scanning period, the image sensor 15 outputs output data associated with a corresponding one of the lines. That is, during a period defined by one horizontal synchronization signal $SH_{sync}$, the image sensor 15 outputs output data indicating the result of detection by a photodiode associated with each of the pixels included in the image sensor 15 at a corresponding timing point in accordance with the data clock signal $SD_{otclock}$.

In this embodiment, the image sensor 15 is driven at a cycle of 120 fps. That is, the sensor cycle of the vertical synchronization signal $SV_{sync}$ of the image sensor 15 is $1/120$ seconds, and the length of a display scanning period of the display portion 40 is set so as to be the same as the length of a display scanning period for a display cycle ($1/70$ seconds) that is shorter than $1/60$ seconds, which is twice the sensor cycle. In FIG. 2, with respect to the image sensor 15, the vertical synchronization signal $SV_{sync}$ and the sensor scanning period are illustrated, and further, a sensor cycle $T_{sv}$, which is $1/120$ seconds in this case, is illustrated just below the time axis.

In addition, the image sensor 15 may be also configured so as to be capable of executing various processes. For example, a circuit capable of executing jumping scanning operation for reading out the results of detections by the photodiodes at a rate of once every n ones of the lines that are arranged in the vertical direction may be provided. Moreover, an adder that calculates the sum of the results of detections by m photodiodes (m being a natural number) that are arranged in the horizontal direction among photodiodes that perform the photoelectric conversion via color filters of the same color, and outputs one m-th of the calculated sum (i.e., an arithmetic average). These modes, which are collectively called a high-speed thinned reading mode, make it possible to read out the detection results corresponding to one frame at a higher speed than a mode for reading out the detection results about the all pixels, and thus, are sometimes used in a live view mode.

The image data generation portion 20 performs processing for generating image data for use in display of an object image by the display portion 40 by means of pipeline processing, while using a line buffer that is secured in advance in the SD-RAM 52 and has a storage capacity enough to store pieces of data corresponding to a plurality of lines. In addition, the line buffer corresponding to the plurality of lines may be provided in the image data generation portion 20 or the like. The display portion 40 displays the object image on the liquid crystal panel 42 on the basis of the generated image data. That is, a user is able to confirm the object while utilizing the display portion 40 as the EVF.

The image data generation portion 20 is capable of performing various image processes. For example, in the case where the number of the pixels included in the image sensor 15 is different from the number of the pixels included in the display portion 40, the image data generation portion 20 performs a pixel number conversion process of adjusting and converting the number of pixels associated with the output data from the image sensor 15 into the number of pixels that can be displayed by the display portion 40. In addition thereto, the image data generation portion 20 can be configured to perform an interpolation process of generating two channels of colors that are lacked in each pixel in the Bayer layout; a color conversion process for color matching; a white balance adjustment process; an interpolation process of interpolating a distortion aberration of lenses due to the configuration of the lenses; a filter process including a sharpness adjustment, a noise removal process, and the like; a gamma correction process of correcting property differences between colors represented by the output data from the image sensor 15 and colors represented by image data handled in the display portion 40; an autofocus adjustment process of automatically adjusting a focal length; and the like.

Further, when a user instructs imaging by operating the operation portion 55, in response to the imaging instruction, the image sensor 15 starts output of output data corresponding to one frame in response to a vertical synchronization signal $SV_{sync}$, and then sequentially reads out output data representing the result of a detection by one of photodiodes associated with all effective pixels of the image sensor 15 at each of timing points in accordance with the data clock signal $SD_{otclock}$ during a period that is defined by a horizontal synchronization signal $SH_{sync}$. Further, the image data generation portion 20 generates image data in the form of JPEG or the like while utilizing the SD-RAM 52 and the like, and records the generated image data into a removable memory (not illustrated) or the like. That is, a user is able to generate image data representing an object. In addition, in order to read out the output data representing the results of detections by the photodiodes associated with the all effective pixels, a reading speed of around 10 fps is required.

Minimization of Delay

In this embodiment, the imaging device 1 is configured to allow the display control portion 30a to control a timing point at which the display portion 40 starts display of partial images corresponding to one frame so as to minimize a display delay from the completion of an imaging operation by the image sensor 15 until the start of a display operation by the display portion 40. That is, in this embodiment, the imaging device 1 is configured to, at each time point at which image data in accordance with which a partial image associated with a corresponding one of the lines forming the image on the liquid crystal panel 42 has been prepared (has become ready for use in display), output a horizontal synchronization signal $DH_{sync}$ (output a vertical synchronization signal $DV_{sync}$ and a horizontal synchronization signal $DH_{sync}$ in the case of a first one of the lines).

Specifically, every time the image data generation portion 20 generates image data corresponding to one line, the image data generation portion 20 outputs the generated image data to the SD-RAM 52 and, simultaneously therewith, outputs line progress information (information indicating the completion of generation of image data corresponding to an X-th line (X being a natural number) of the lines that are arranged in the vertical direction) to the display portion timing generator 30. The display portion timing generator 30 includes a recording portion (not illustrated), such as a register, which receives and records the line progress information, and is capable of retaining line progress information corresponding to four frames (this number of the frames being the same as the number of frames corresponding to image data that can be recorded in the VRAM 51).

The display control portion 30a is capable of specifying a line on which the image data generation portion 20 has completed preparation for display, by referring to the recording portion. In addition, the image data corresponding to each of the lines is recorded into the VRAM 51 of the SD-RAM 52. As described above, the VRAM 51 is capable of recording image data corresponding to four frames, and when the image data corresponding to four frames has been recorded, image data corresponding to a frame and having been recorded at an earlier timing point than any other one of the recorded image data corresponding to four frames is sequentially overwritten by the most newly generated image data corresponding to a frame. Accordingly, in the display portion timing generator 30, when, while line progress information corresponding to one frame is sequentially recorded into the recording portion, line progress information corresponding to four frames have been recorded, similarly, line progress information corresponding to a frame and having been recorded at an earlier timing point than any other one of the recorded line progress information corresponding to four frames is sequentially overwritten by the most newly generated line progress information corresponding to a frame.

In addition, in this embodiment, every time the image sensor 15 performs an imaging operation, the image data generation portion 20 sequentially generates image data by processing output data from the image sensor 15, and sequentially records the generated image data into the VRAM 51. Accordingly, image data representing an object image having been captured by the image sensor 15 at each frame is recorded in the VRAM 51, and line progress information associated with each frame is recorded in the recording portion of the display portion timing generator 30. Further, with respect to the line progress information, up to four pieces of line progress information corresponding to four frames can be recorded and the four pieces of line progress information are updated in accordance with a FIFO rule. Thus, the line progress information having been recorded in the recording portion of the display portion timing generator 30 can be also regarded as imaging progress information indicating the progress of the number of the imaging operations by the image sensor 15. That is, the line progress information is information indicating the progress of the processing for generating image data in accordance with which the display process on each of the lines existing between the first line and the last line is performed, and simultaneously therewith, the line progress information is information indicating the number of imaging operations each being a source of the processing for generating image data associated with the individual lines (that is, the line progress information is information indicating a frame of the image sensor 15).

Accordingly, it is possible to specify that output data corresponding to an odd number-th frame has been output from the image sensor 15 and is in a state of being processed by the image data generation portion 20, by monitoring recording areas in which pieces of line progress information for first and third frames are recorded and thereby specifying that any one of these pieces of line progress information is in a state of being overwritten. In this configuration, the display control portion 30a performs monitoring of the pieces of line progress information and control of outputting a vertical synchronization signal $DV_{sync}$, at a rate of once every two iterations of the imaging operation by the image sensor 15.

That is, the display control portion 30a causes the display portion timing generator 30 to output the data clock signal $DD_{otclock}$, and in a state in which the data clock signal $DD_{otclock}$ is continuously output, the display control portion 30a monitors line progress information indicating the progress of processing for generating image data on the basis of output data corresponding to a first frame in the image sensor 15. When progress information indicating the completion of generation of image data corresponding to the first line has been recorded in the recording portion of the display portion timing generator 30, the display control portion 30a causes the display portion timing generator 30 to output a vertical synchronization signal $DV_{sync}$.

When the vertical synchronization signal $DV_{sync}$ has been output, the display control portion 30a causes the display portion timing generator 30 to output a horizontal synchronization signal $DH_{sync}$. In response to the horizontal synchronization signal $DH_{sync}$, a display process corresponding to one frame is started, and when this display process has been completed, the display control portion 30a monitors whether or not line progress information indicating the completion of processing for generating image data corresponding to a second line has been recorded in the recording portion of the display portion timing generator 30. When the line progress information indicating the completion of the processing for generating image data corresponding to the second line has been recorded, the display control portion 30a causes the display portion timing generator 30 to output a horizontal synchronization signal $DH_{sync}$.

Subsequently thereto, the display control portion 30a continues the above control on each subsequent line until the last line of the display portion 40 while causing the display portion timing generator 30 to output a horizontal synchronization signal $DH_{sync}$ that causes the display process on the each subsequent line to be performed, in accordance with the progress of processing for generating image data corresponding to the each subsequent line. Further, when the display process on the last line is performed, the display control portion 30a causes the display portion timing generator 30 to output a last horizontal synchronization signal $DH_{sync}$ in the first frame, and then, monitors line progress information indicating the progress of processing for generating image data on the basis of output data corresponding to a third frame in the image sensor 15. Further, when line progress information indicating the completion of processing for generating image data corresponding to a first line on the basis of output data corresponding to the relevant third frame has been recorded in the recording portion of the display portion timing generator 30, the display control portion 30a causes the display portion timing generator 30 to output a vertical synchronization signal $DV_{sync}$. Subsequently thereto, the display control portion 30a sequentially causes the display portion timing generator 30 to output the individual signals that cause the display process on each of subsequent lines to be performed, in accordance with line progress information.

In addition, in this embodiment, in a portion posterior to a vertical synchronization signal $DV_{sync}$ and a portion anterior to the vertical synchronization signal $DV_{sync}$, the display control portion 30a secures a back porch period having a predetermined length for the vertical synchronization signal $DV_{sync}$ and a front porch period having a predetermined length for the vertical synchronization signal $DV_{sync}$, respectively; and in a portion posterior to a horizontal synchronization signal $DH_{sync}$ and a portion anterior to the horizontal synchronization signal $DH_{sync}$, the display control portion 30a secures a back porch period having a predetermined length for the horizontal synchronization signal $DH_{sync}$ and a front porch period having a predetermined length for the horizontal synchronization signal $DH_{sync}$, respectively. That is, each of the two kinds of back porch periods and the two kinds of front porch periods has a length that is defined in advance by a corresponding total number of the data clock signals $DD_{otclock}$. The display control portion 30a determines the length of each of the two kinds of back porch periods and the two kinds of front porch periods by counting the data clock signals $DD_{otclock}$. Further, the display control portion 30a causes the display portion timing generator 30 to output the vertical synchronization signal $DV_{sync}$ and the horizontal synchronization signal $DH_{sync}$ while securing the length of each of the two kinds of back porch periods and the two kinds of front porch periods. For example, when the total number of the data clock signals $DD_{otclock}$ having been output subsequent to the output of a vertical synchronization signal $DV_{sync}$ has reached a predetermined total number corresponding to the back porch period for the vertical synchronization signal $DV_{sync}$, the display control portion 30a causes the display portion timing generator 30 to output a signal indicating that the data active signal $DD_{active}$ is active and a horizontal synchronization signal $DH_{sync}$ that causes the display process corresponding to the first line to be performed. Further, when the total number of the data clock signal $DD_{otclock}$ having been output subsequent to the output of the horizontal synchronization signal $DH_{sync}$ has reached a predetermined total number corresponding to the back porch period for the horizontal synchronization signal $DH_{sync}$, the display control portion 30a causes the display portion timing generator 30 to output a signal (not illustrated) indicating that a signal indicating a display scanning period in the horizontal direction (i.e., a period during which each of pixels belonging to one line is supplied with a voltage corresponding to image data associated with the each pixel) is in an active state.

Meanwhile, when the total number of the data clock signals $DD_{otclock}$ having been output subsequent to the completion of the display processes corresponding to one line and having been started in response to the horizontal synchronization signal $DH_{sync}$ has reached a predetermined total number corresponding to the front porch period for the horizontal synchronization signal $DH_{sync}$, the display control portion 30a monitors whether or not line progress information indicating the completion of processing for generating image data corresponding to a second line has been recorded in the recording portion of the display portion timing generator 30. For each of subsequent lines, similarly, the display control portion 30a monitors corresponding line progress information and causes the display portion timing generator 30 to output a corresponding horizontal synchronization signal $DH_{sync}$. According to this configuration, a display process of displaying a partial image corresponding to each of the lines is performed after the completion of preparation for execution of the relevant display process, and thus, even when, in the display portion 40, after the start of the display processes, a delay in preparation for display has occurred on a certain line and has continued for a long time, it is possible to configure so as not to cause a failure in the display operation. Further, when the total number of the data clock signals $DD_{otclock}$ having been output subsequent to the completion of the display process corresponding to the last line and having been performed in response to a horizontal synchronization signal $DH_{sync}$ has reached a predetermined total number corresponding to the front porch period for the vertical synchronization signal $DV_{sync}$, the display control portion 30a monitors line progress information that is recorded in the recording portion of the display portion timing generator 30 and that indicates the progress of processing for generating image data on the basis of output data corresponding to a third frame.

In addition, in this embodiment, a period from the completion of a display process on any one of the lines until the output of a horizontal synchronization signal $DH_{sync}$ corresponding to a subsequent one of the lines as well as a period from the completion of a display process on a last one of the lines until the output of a vertical synchronization signal $DV_{sync}$ corresponding to a subsequent frame is a period whose length is variable in accordance with the state of corresponding line progress information. In this embodiment, since a front porch period is a period that is required at a minimum, it is enough just to secure the front porch period having a predetermined length within the relevant period whose length is variable. That is, various configurations can be made, and the front porch period may be secured immediately after the completion of a display process, as described above, or the front porch period may be secured immediately before a subsequent horizontal synchronization signal $DH_{sync}$ or a subsequent vertical synchronization signal $DV_{sync}$. Further, when the length of the period whose length is variable becomes longer than that of the front porch period, every time a period whose length is determined in advance as that of a horizontal synchronization signal $DH_{sync}$ elapses, the display control portion 30a causes the display portion timing generator 30 to output a dummy of the horizontal synchronization signal $DH_{sync}$.

In this embodiment, the display control portion 30a performs the above control at a rate of once every two iterations of the imaging operation by the image sensor 15. That is, after the display portion 40 has completed the display process on the last line in a j-th frame, j being a natural number (for example, an x-frame in FIG. 3), the display control portion 30a monitors line progress information for a (2j+1)th frame of the image sensor 15 (for example, a (y+2)th frame in FIG. 3), and causes the display portion timing generator 30 to output various signals on the basis of line progress information relating to individual lines.

When the various signals, such as the vertical synchronization signal $DV_{sync}$, are output from the display portion timing generator 30, the various signals, such as the vertical synchronization signal $DV_{sync}$, are supplied to the liquid crystal panel 42 via the liquid crystal panel driver 41. The liquid crystal panel 42 performs the display processes in accordance with the various signals, such as the vertical synchronization signal $DV_{sync}$. Accordingly, the liquid crystal panel 42 starts the display of partial images corresponding to one frame when processing for generating image data corresponding to a first line has been completed, at a rate of once every two iterations of the imaging operation by the image sensor 15. In FIG. 2, charge accumulation periods during each of which electric charges are accumulated for each line are schematically illustrated just below the sensor scanning periods. In FIG. 2, lines that are targets of the accumulations of electric charges in the image sensor 15 are schematically illustrated so as to be arranged from the upper side toward the lower side in FIG. 2 in order in which each of the accumulations of electric charges is sequentially performed. Thus, when a charge accumulation period for an imaging start line that is illustrated at the most upper side has been completed, a sensor scanning period is started, and when a charge accumulation period for an imaging end line that is illustrated at the most lowest side has been completed, the sensor scanning period is completed.

When a charge accumulation period for each line has been completed, output data indicating accumulated electric charge amounts corresponding to the relevant line is supplied to the image data generation portion 20, and thus, the image data generation portion 20 sequentially performs the image processing. In FIG. 2, image processing periods in the image data generation portion 20 are schematically illustrated just below the charge accumulation periods. In FIG. 2, lines that are targets of the image processing are schematically illustrated so as to be arranged from the upper side toward the lower side in order in which the image processing is sequentially performed (i.e., in order in which imaging has been sequentially performed). Thus, when an image processing period for an image processing start line that is illustrated at the most upper side has been completed, image data representing a partial image corresponding to the relevant line (a first line) is recorded into the VRAM 51 of the SD-RAM 52, and line progress information is recorded into the recording portion of the display portion timing generator 30. Subsequently thereto, as image processing on each of subsequent lines proceeds, the record of image data and the record of line progress information are performed for each of the subsequent lines, and when image processing on a processing end line that is illustrated at the most lower side in FIG. 2 has been completed, the record of image data and the record of line progress information with respect to a last line are completed.

As described above, in the course in which image processing on each of lines existing between a first line and a last line proceeds, the display control portion 30a performs control of causing the display portion timing generator 30 to output a vertical synchronization signal $DV_{sync}$ by being triggered by line progress information indicating the completion of processing for generating image data corresponding to the first line. Thus, for example, a vertical synchronization signal $DV_{sync}$ is output at a time point $t_1$ shown in FIG. 2, and then, after an elapse of a predetermined duration time of the back porch DB, a display scanning period is started.

During the relevant display scanning period, in the liquid crystal panel 42, a display process of displaying a partial image corresponding to each of the lines is sequentially performed. That is, the imaging device 1 includes the image data output portion 21, and this image data output portion 21 sequentially performs processing for acquiring image data corresponding to each of the lines existing between the first line and the last line and forming the image on the liquid crystal panel 42, and supplying the acquired image data to the liquid crystal panel driver 41. Thus, during the display scanning period, while being synchronized with each of horizontal synchronization signals $DH_{sync}$, the display control portion 30a outputs corresponding image data recorded in the VRAM 51 to the display portion 40 as image data (Data) associated with a corresponding one of the lines. Accordingly, during the display scanning period, the liquid crystal panel 42 operates in synchronization with each of horizontal synchronization signals $DH_{sync}$ that are output from the display timing generator 30, and thereby a partial image associated with a corresponding one of the lines existing between the first line and the last line and forming the image on the liquid crystal panel 42 is sequentially displayed.

In FIG. 2, display processing periods during each of which a partial image corresponding to each of the lines is sequentially displayed in the liquid crystal panel 42 are schematically illustrated just below the display scanning periods. In FIG. 2, the lines that are targets of the display processes are schematically illustrated so as to be arranged from the upper side toward the lower side in order in which each of the display processes is sequentially performed in the liquid crystal panel 42. That is, when a display scanning period has been started, a display process on a first line that is illustrated at the most upper side is performed. Subsequently thereto, a display process on each of subsequent lines is sequentially performed, and when a display process on a last line that is illustrated at the most lower side has been completed, the display processing period is completed.

As described above, in this embodiment, the display control portion 30a starts the display of partial images corresponding to one frame when a partial image corresponding to the first line (a predetermined number-th line) of the display portion 40 has become ready for being displayed. Thus, in the display portion 40, when a partial image corresponding to the first line has become ready for being displayed, a minimally required period of the back porch DB is secured and then immediately, display processes of displaying partial images corresponding to one frame are started from a display process on the first line. As a result, as compared with the conventional configuration in which the display processes are started after waiting of time duration equal to the display delay Δt having a large amount including a sufficient margin, the above-described configuration of this embodiment makes it possible to make a display delay (denoted by ΔT in FIG. 2) smaller and further minimize the display delay, the display delay being a period from the completion of the imaging operation by the image sensor 15 until the start of display of an object by the display portion 40.

In addition, in the above-described conventional configuration, it has been necessary to secure the display delay Δt having a large amount including a sufficient margin in order not to cause a display failure even when the length of a period that is required in the image processing by the image generation portion 20 becomes longer than in a normal case due to an incidental cause or the like. According to the above-described configuration of this embodiment, however, even when the length of a period during that is required in the image processing by the image generation portion 20 has become longer than in a normal case due to an incidental cause or the like, the display control portion 30*a* adjusts a timing point at which the display processes by the display portion 40 are started, in accordance with an amount of delay in preparation for display, and thus, any amount of delay in preparation for display can be led to a minimal display delay amount.

Figure 3:
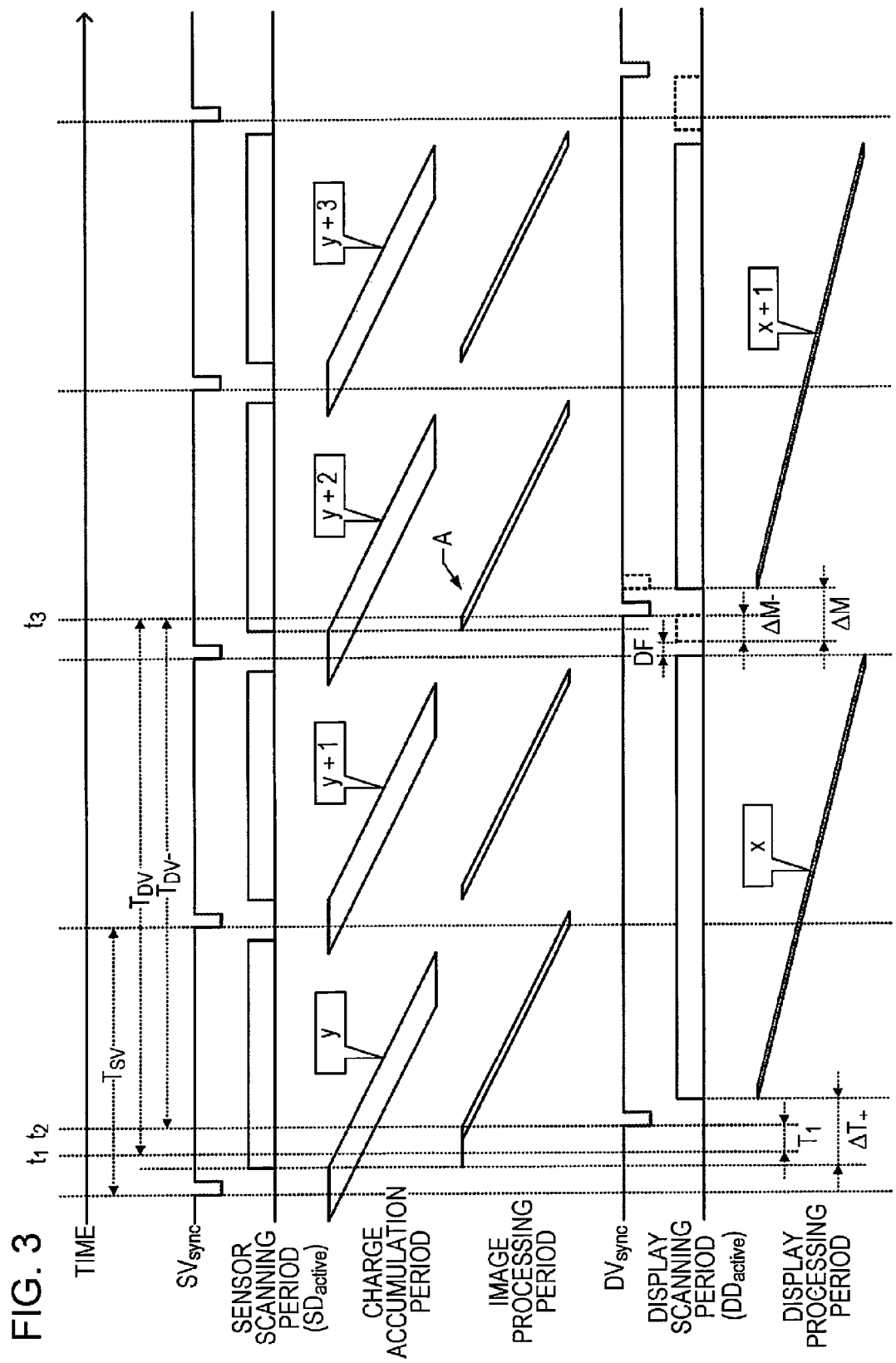
FIG. 3 is a timing chart of signals.

FIG. 3 is a timing chart in the case where the length of a period during which image processing on a first line is performed by the image generation portion 20 has become longer than in a normal case due to an incidental cause (for example, a cause in that a distortion aberration correction has become necessary because of a rapid zooming operation of a lens). In FIG. 3, there is shown an example of a case where the length of an image processing period for a first line that is located at the most upper side of the image processing period is longer than that of the image processing period shown in FIG. 2 by a delay $T_1$. When preparation for display for the first line has been delayed by the delay $T_1$, a timing point at which the preparation for display for the first line has been completed and line progress information corresponding to the first line is output to the display portion timing generator 30 is delayed by the delay $T_1$.

Thus, the display control portion 30*a* comes into a wait state until the line progress information corresponding to the first line has been recorded in the recording portion of the display portion timing generator 30, and as a result, in the example shown in FIG. 3, a vertical synchronization signal $DV_{sync}$ is output from the display portion timing generator 30 at a timing point $t_2$ that is later than the timing point $t_1$ in the example shown in FIG. 2 by the delay $T_1$. In the display portion 40, the display of partial images corresponding to one frame is started by being triggered by the output of the vertical synchronization signal $DV_{sync}$ from the display portion timing generator 30. As described above, in this embodiment, although the display portion 40 is in a wait state until a partial image corresponding to the first line becomes ready for being displayed, upon completion of preparation for display of the partial image corresponding to the first frame, the display portion 40 starts display thereof without any delay time. Thus, for at least the first line, no matter what kind of processing for generating image data is performed and how a delay occurs before the completion of preparation for display, upon completion of the preparation for display for the first line, the display is started. Accordingly, in this embodiment, although the start of the display is delayed by only a waiting period that is inevitably required to wait until the completion of preparation for display, and the display delay becomes a delay $\Delta T_+$ shown in FIG. 3, as a result, after an elapse of the inevitably required waiting period, the display is started, thereby enabling any amount of delay in the preparation for display to be led to a minimal display delay amount.

Elimination of Display Delay

In this embodiment, the display control portion 30*a* performs control so as to make the data active signal $DD_{active}$ active during a display scanning period for the display cycle that is 1/70 seconds shorter than 1/60 seconds. Thus, when it is assumed that each of the lengths of the back porch DB and the front porch DB is set so as to be equal to a corresponding one of predetermined lengths in the case where the display cycle is 1/70 seconds, a length TD consisting of the lengths of the back porch DB, the display scanning period, and the front porch DF becomes shorter than the length of the period $T_{DV}$, which is 1/60 seconds that is twice the sensor cycle, by the margin ΔM, as shown in FIG. 2. Accordingly, in this embodiment, even when the length of a period between two successive vertical synchronization signals $DV_{sync}$ is made shorter by the margin ΔM, the front porch DF having the predetermined length can be secured. Thus, in this embodiment, even when image data representing a partial image corresponding to the first line is delayed due to an incidental cause or the like and thereby, as shown in FIG. 3, a delay occurs in the start of display by the display portion 40, this delay can be absorbed by the margin ΔM.

Specifically, as shown in the example illustrated in FIG. 3, when the delay $T_1$ that is a delay in preparation for display for the first line and that has occurred before the start of display by the display portion 40 falls within the margin ΔM, the delay $T_1$ in preparation for display for the first line can be absorbed in the course in which the display portion 40 performs display processes during one display cycle. That is, when the time $T_1$ corresponding to a delay in preparation for display for the first line has elapsed in image processing based on the result of imaging corresponding to the y-th frame in the image sensor 15, the display control portion 30*a* outputs a vertical synchronization signal $DV_{sync}$ in response to line progress information that is output after an elapse of the time $T_1$ corresponding to the delay in preparation for display. Further, in response to the relevant vertical synchronization signal $DV_{sync}$, the display portion 40 starts a display processing period corresponding to the x-th frame in the display portion 40, as shown in FIG. 3. When display processes on lines existing between a first line and a last line and corresponding to the relevant x-th frame have been completed, in order to display the contents of imaging corresponding to a (y+2)th frame in the image sensor 15, after an elapse of the period of the front porch DF having the predetermined length, the display control portion 30*a* monitors line progress information indicating that image data corresponding to a first line have been generated on the basis of output data corresponding to the (y+2)th frame.

When the delay in the image processing by the image data generation portion 20 has been eliminated and output data corresponding to the (y+2)th frame in the image sensor 15 has been output, just like in the example shown in FIG. 2, the image data generation portion 20 generates image data corresponding to the first line during a period whose length is normal, and outputs line progress information indicating that the image data corresponding to the first line have been generated, to the display portion timing generator 30. When the relevant line progress information has been recorded, the display control portion 30*a* causes the display portion timing generator 30 to output a vertical synchronization signal $DV_{sync}$. As a result, after an elapse of the predetermined duration of the back porch subsequent to the output of the vertical synchronization signal $DV_{sync}$, the display portion 40 starts display processes corresponding to an (x+1)th frame.

Here, as shown in FIG. 3, the image sensor 15 performs imaging operations at intervals of the sensor cycle $T_{SV}$ having a constant length, and the cycle of the output of output data that is required in generation of image data corresponding to a first line of the display portion 40 is also equal to the sensor cycle $T_{SV}$ having a constant length. Thus, when, as shown by an arrow A of FIG. 3, image data corresponding to a first line is generated during a period whose length is normal, on the basis of output data corresponding to the (y+2)th frame in the image sensor 15, a timing point $t_3$ at which a vertical synchronization signal $DV_{sync}$ is output becomes the same as a timing point $t_4$ of the output of a vertical synchronization signal $DV_{sync}$ corresponding to an (x+1)th frame in the example shown in FIG. 2, in which the generation of image data corresponding to the first line is not delayed.

That is, since the margin ΔM is provided after the display scanning period for the x-th frame in the display portion 40 and the front porch DF subsequent thereto, when line progress information indicating that image data corresponding to the first line has been generated on the basis of output data corresponding to the (y+2)th frame has been output at any timing point falling within the relevant margin ΔM, the display control portion 30a causes the display portion timing generator 30 to output a vertical synchronization signal $DV_{sync}$ before the margin ΔM has elapsed. Further, in the case where the delay $T_1$ in preparation for display falls within the margin ΔM, since a vertical synchronization signal $DV_{sync}$ is output when a period corresponding to the delay T1 has elapsed before an elapse of the margin ΔM, as a result, the margin ΔM is reduced to a margin ΔM– shown in FIG. 3 by the period corresponding to the delay $T_1$. Accordingly, the length of a period $T_{DV}$– that is a period between two successive vertical synchronization signals $DV_{sync}$ and that is a display cycle of the x-th frame becomes shorter than the length of the period $T_{DV}$, which is 1/60 seconds, and the delay $T_1$ in preparation for display is absorbed in the course in which the display portion 40 performs display processes during one display cycle.

Figure 4:
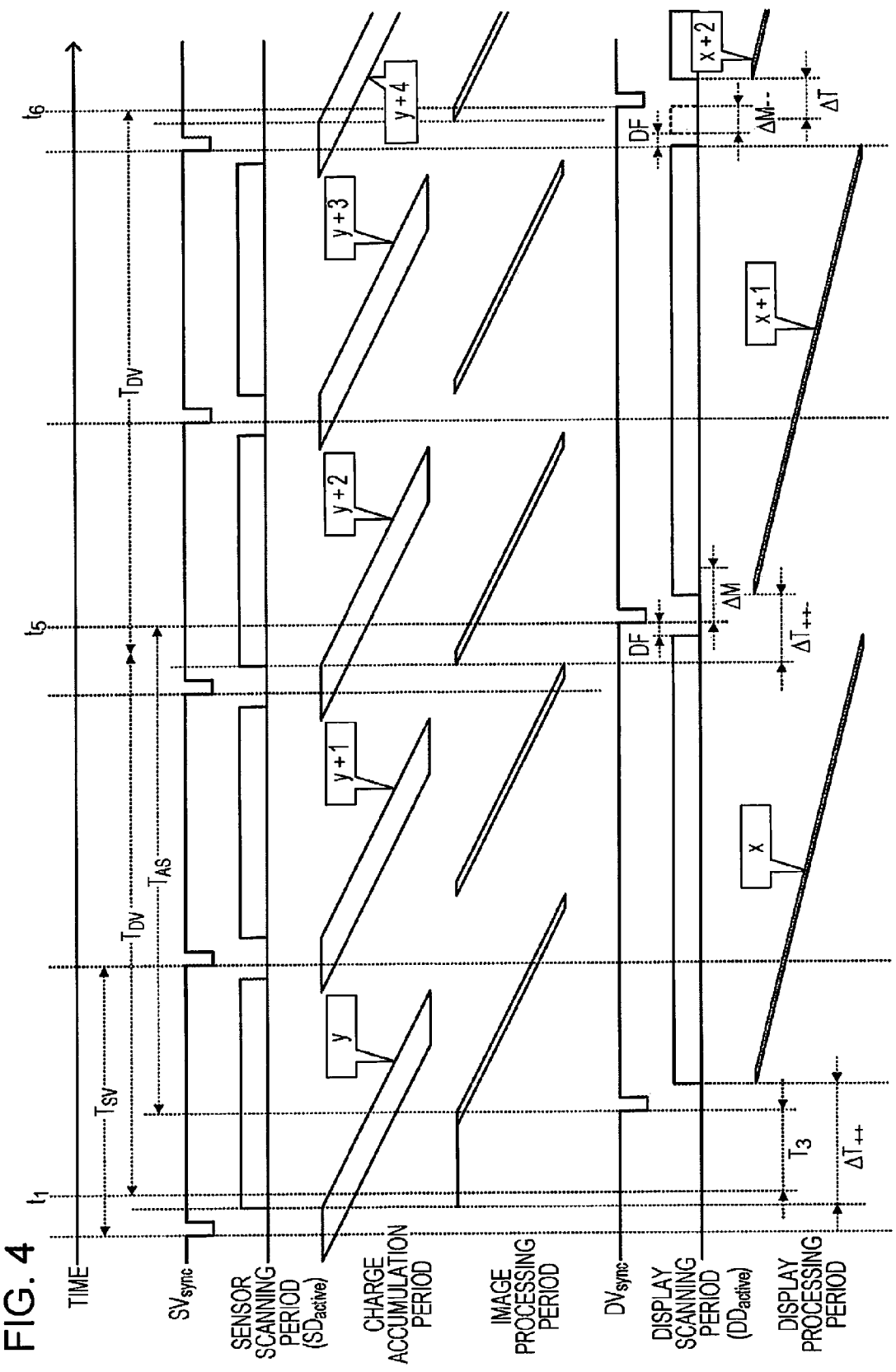
FIG. 4 is a timing chart of signals.

Moreover, in the case where the amount of delay in the preparation for display is larger than the length of the margin ΔM, it is possible to absorb the delay $T_1$ in preparation for display in the course in which the display portion 40 performs display processes during a plurality of display cycles. For example, it is assumed a case where the length of the delay $T_1$ in preparation for display in the example shown in FIG. 3 is one and half times the length of the margin ΔM and, as a result, a display delay is a delay $\Delta T_{++}$ whose length is larger than that of the display delay in FIG. 2. In this case here, it is further assumed a case where image data corresponding to a first line are generated during a period having a normal length on the basis of output data corresponding to the (y+2)th frame in the image sensor 15. FIG. 4 illustrates a timing chart in this case. That is, the length of a delay $T_3$ in preparation for display, shown in FIG. 4, is one and half times the length of the margin ΔM shown in FIG. 2.

In this case, when the display portion 40 has completed display processes up to a last one of lines corresponding to the x-th frame, line progress information relating to a first one of lines corresponding to the (x+1)th frame (i.e., line progress information relating to image data that are generated from output data corresponding to the (y+2)th frame) is already recorded in the recording portion of the display portion timing generator 30. Thus, the display control portion 30a secures the period of the front porch DF, and then immediately cause the display portion timing generator 30 to output a vertical synchronization signal $DV_{sync}$. That is, as shown in FIG. 4, a vertical synchronization signal $DV_{sync}$ corresponding to the (x+1)th frame is output at a timing point $t_5$ without any provision of the margin ΔM. As a result, in the (x+1)th frame, the display portion 40 comes into a state in which a period corresponding to the delay ΔM and being included in the delay $T_3$ in preparation for display is eliminated and a period corresponding to half the margin ΔM (i.e., a period ΔM/2) is left behind as a delay. Accordingly, in the (x+1)th frame, the delay $\Delta T_{++}$, which has been the display delay in the x-th frame, is reduced by only the margin ΔM, and results in a delay $\Delta T_{++-}$.

Moreover, at the time when the display portion 40 has completed display processes up to a last one of lines forming the (x+1)th frame, line progress information relating to a first one of lines forming an (x+2)th frame (i.e., line progress information relating to image data that is generated from output data corresponding to a (y+4)th frame) is not yet recorded in the display portion timing generator 30. Thus, the display control portion 30a secures the period of the front porch DF and then waits until the line progress information relating to the first one of lines forming the (x+2)th frame is recorded in the recording portion of the display portion timing generator 30. When the line progress information relating to the first one of lines forming the (x+2)th frame has been recorded in the recording portion of the display portion timing generator 30, the display control portion 30a causes the display portion timing generator 30 to output a vertical synchronization signal $DV_{sync}$ at a timing point $t_6$.

That is, the period ΔM/2, which has been left behind as a display delay, is absorbed by the margin ΔM and after having waited for the record of line progress information during a period corresponding to the length of a margin ΔM–– (which is equal to the length of the period ΔM/2), the display control portion 30a causes the display portion timing generator 30 to output a vertical synchronization signal $DV_{sync}$. As a result, in the (x+2)th frame, the display portion 40 comes into a state in which the delay corresponding to the period ΔM/2, which has been left behind as a display delay at the time point of the beginning of the (x+1)th frame, is eliminated and, as a result, any additional display delay is not left behind (i.e., a display delay is equal to the delay ΔT shown in in FIG. 2). Accordingly, in this embodiment, even when a delay whose length is larger than that of the margin ΔM has temporarily occurred in preparation for display, the delay is gradually reduced in the course of a plurality of display cycles in the display portion 40. Further, the display cycle in the display portion 40 is a degree of 1/60 seconds, and thus, even though the delay continues during the plurality of display cycles, actual feeling of the delay is instantaneous. Accordingly, even when a delay whose length is larger than that of the margin ΔM has temporarily occurred in preparation for display, the delay is eliminated after an elapse of such an instantaneous period in actual feeling.

In this embodiment, even when a display delay cannot be absorbed during one display cycle, the display delay can be absorbed after an elapse of a plurality of display cycles. Thus, it is unnecessary to set the length of the margin ΔM to an excessively large value, and it is enough just to set it to a small value (for example, a value of several milliseconds). Accordingly, it is unnecessary to set a period having an excessively short length (for example, this length being nearly equal to that of the sensor cycle) as the display scanning period whose length is shorter than that of the display scanning period for the display cycle that is twice the sensor cycle. Further, when the length of the margin ΔM is set to a small value, it is possible to drive the display portion 40 during a display scanning period whose length is nearly equal to that of the display scanning period for the display cycle that is twice the sensor cycle. Accordingly, it is possible to suppress the increase of an amount of power consumed by the display portion 40 to a greater degree, as compared with a configuration in which the display portion 40 is driven during a display scanning period whose length is excessively short (for example, this length being nearly equal to that of the sensor cycle).

Moreover, in the case where the value of the margin ΔM is small just like in this embodiment, when focusing attention on the display scanning period and the sensor scanning period, as a result, the image sensor 15 is driven at a speed that is nearly twice the speed of the drive of the display portion 40 (at intervals of a cycle nearly equal to half the cycle of the drive of the display portion 40), and the image sensor 15 is driven at a speed that is sufficiently higher than the speed of the drive of the display portion 40. Such a configuration that allows the image sensor 15 to be driven at a speed higher than that of the drive of the display portion 40, that is, a configuration that allows the display portion 40 to display an image within a display scanning period whose length is shorter than that of a display scanning period for a display cycle that is twice the sensor cycle, and is longer than the length of a display scanning period for a display cycle that is the same as the sensor cycle, makes it possible to cause the generation of image data to precede display processes based on the image data.

More specifically, in general, in order to enable display of all moving images that are captured at intervals of a sensor cycle of the image sensor 15, or the like, processing for generating image data corresponding to all display lines is configured so as to be completed within the sensor cycle of the image sensor 15. For example, in this embodiment, as shown in FIG. 2, each of the image data processing periods is completed within a corresponding one of the charge accumulation periods. In contrast, a display speed in the display portion 40 is significantly lower than a normal speed at which preparation for display for each line is completed.

Accordingly, as far as any delay that exceptionally continues for a long period does not occur in preparation for display due to an incidental cause or the like, in most cases, the preparation for display for each line precedes display for the each line, thus enabling display for each line to be performed in a state in which preparation for display for the each line is completed. Further, the degree of precedence of preparation for display for a noticed line increases as the noticed line comes near a last line. Thus, a reserve capacity for absorbing a delay in preparation for display at a noticed time point increases as the noticed time point comes near the end of a display cycle, and through a combination of such a configuration with a configuration in which the display portion 40 performs display processes during a display scanning period whose length is shorter than that of a display scanning period for the display cycle that is twice the sensor cycle, it is possible to provide an imaging device capable of bringing about a significantly large reserve capacity for absorbing any delay in preparation for display.

Figure 5:
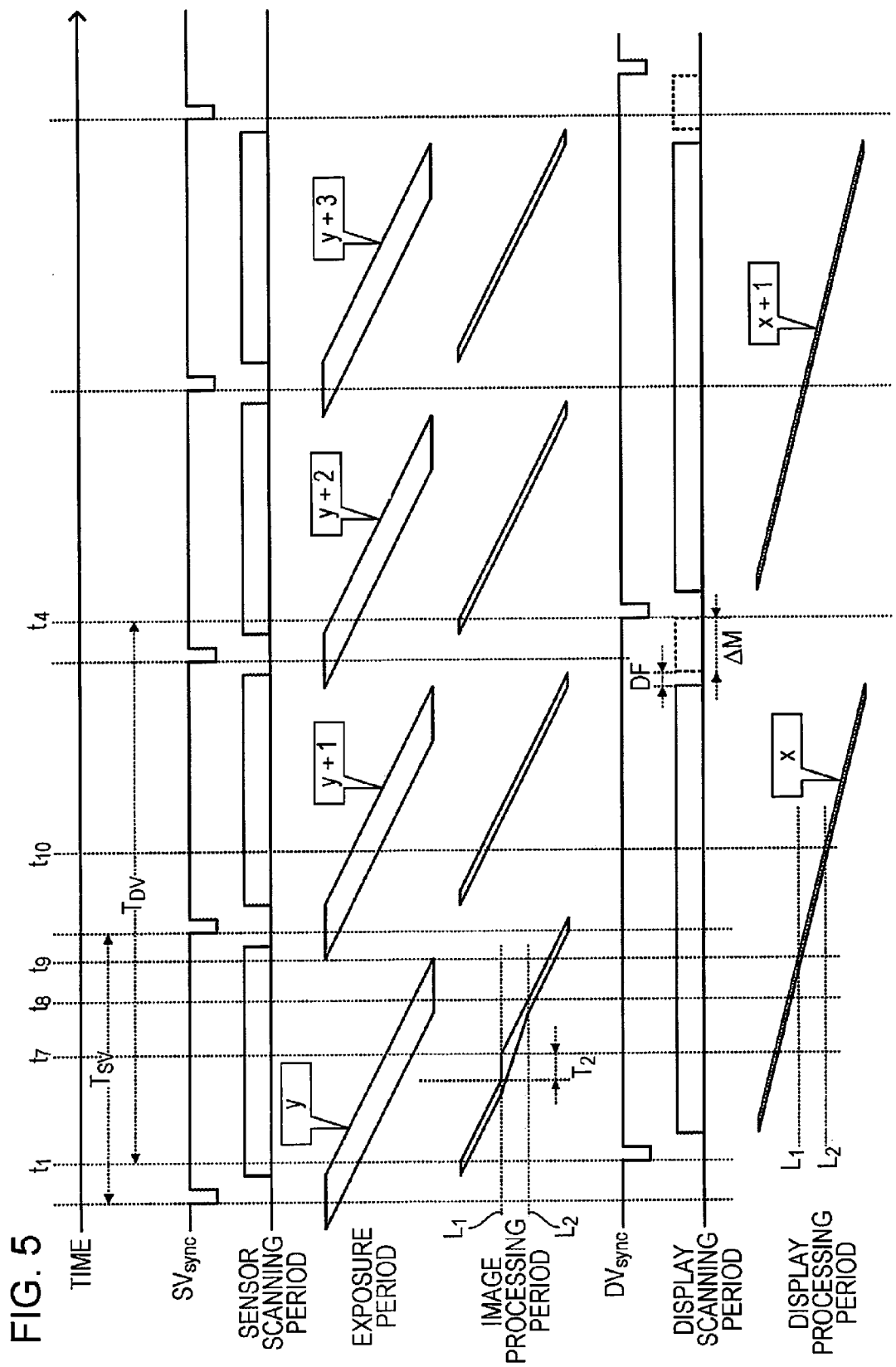
FIG. 5 is a timing chart of signals.

FIG. 5 is a timing chart that describes a reserve capacity for absorbing a delay that occurs because of a difference in a driving speed between the image sensor 15 and the display portion 40 that are configured in the above manner. In FIG. 5, there is illustrated an example of a case where, although the generation of image data corresponding to a first line among image data for use in display of an image corresponding to an x-th frame is not delayed, a time point at which image processing on a $L_1$-th line has been completed is delayed by a delay $T_2$ relative to a normal completion time point. Further, in this example, afterward, the delay $T_2$ is gradually reduced and, as a result, an image processing speed returns to a normal speed in image processing on a $L_2$-th line.

In the above example, the image processing on the $L_1$-th line is completed at a timing point $t_7$ and the image processing on the $L_2$-th line is completed at a timing point $t_8$. The display portion 40 sequentially performs, for each of a first line and subsequent lines, a display process based on image data corresponding to the relevant line, in accordance with the progress of image processing on the relevant line, and, in this embodiment, as described above, a display speed in the display portion 40 is significantly lower than a normal speed at which preparation for display for each line is completed. Accordingly, in the display portion 40, a timing point $t_9$ at which a display process on the $L_1$-th line is started is remarkably late, and even when a timing point at which the image processing on the $L_1$-th line has been completed is delayed by a time $T_2$ relative to the normal completion timing point, the display portion 40 is capable of starting a display process on the $L_1$-th line without being subjected to any influence of the relevant delay. Further, similar description can be applied to the $L_2$-th line, and the display portion 40 is capable of starting a display process on the $L_2$-th line without being subjected to any influence of a delay in preparation for display.

Moreover, when comparing the $L_1$-th line and the $L_2$-th line, a time lag ($t_{10}$-$t_8$) from the end of image processing until the end of a display process with respect to the $L_2$-th line is larger than a time lag ($t_9$-$t_7$) from the end of image processing until the end of a display process with respect to the $L_1$-th line. As described above, the degree of precedence of preparation for display for a noticed line increases as the noticed line comes near a last line. Thus, a reserve capacity for absorbing a delay in preparation for display at a noticed time point increases as the noticed time point comes near the end of a display cycle, and in this embodiment, it is possible to allow the display portion 40 to perform display processes while utilizing the reserve capacity that is produced in such a manner as described above in the absorption of a delay in preparation for display.

In addition, a configuration in which a sensor speed in the image sensor 15 is higher than a display speed in the display portion 40 is not limited to a configuration in which the former is nearly twice the latter, and the former may be N times the latter, N being an integer larger than or equal to "3". Further, for any N, it is possible to efficiently display an image by performing display of partial images represented by image data during a display scanning period whose length is between the length of a display scanning period for a display cycle that is (N-1) times a sensor cycle and the length of a display scanning period for a display cycle that is N times the sensor cycle, and controlling output signals from the display timing generator 30 such that the relevant display of partial images is performed at a rate of once every N iterations of the imaging operation by the image sensor 15.

For example, in the case where N is equal to "3", when the display processes are performed during a display scanning period whose length is shorter than that of a display scanning period for a display cycle that is (N-1) times (i.e., twice in this case) the sensor cycle, it is possible to employ both of two kinds of configurations: one being a configuration in which the display processes by the display portion 40 are started at a rate of once every three iterations of the imaging operation by the image sensor 15; the other one being a configuration in which the display processes by the display portion 40 are started at a rate of once every two iterations of the imaging operation by the image sensor 15. As a result, in the former, captured images are not displayed at a rate of twice every three iterations of the imaging operation; while, in the latter, captured images are not displayed at a rate of once every two iterations of the imaging operation. Thus, the latter is more effective than the former and, in the latter, the number of lacked frames is smaller and thus displayed images are viewed more smoothly. Accordingly, preferably, the length of the display scanning period is set to a length between the length of a display scanning period for a display cycle that is (N−1) times the sensor cycle and the length of a display scanning period for a display cycle that is N times the sensor cycle.

Synchronization of Image Sensor and Display Portion

In this embodiment, any delay in preparation for display is stabilized into a delay in a normal state as a result of the above-described minimization of a delay and elimination of a display delay, and thereby, as a result, a display cycle of the display processes based on image data by the display portion 40 is synchronized with twice the sensor cycle. That is, in this embodiment, in the case where a state in which preparation for display is excessively delayed due to an incidental cause is not continued and image processing is stably performed (that is, in the case where any delay in preparation for display can be eliminated in the course of one display cycle), it is possible to start display processes when a partial image corresponding to a first line of a frame subsequent to a certain frame has become ready for being displayed. Thus, a timing point at which the partial image corresponding to the first line becomes ready for being displayed is synchronized with a timing point which is within a sensor cycle and at which preparation for display of the partial image corresponding to the first line has been completed. Further, the display control portion 30*a* performs control of causing the display portion 40 to display a partial image corresponding to a first line by being triggered by the completion of preparation for the relevant display, at a rate of once every two iterations of the imaging operation by the image sensor 15. Thus, when the image processing is stably performed, the display portion 40 displays each of partial images in synchronization with a corresponding one of specific timing points, at a rate of once every two iterations of the sensor cycle. As a result, a display cycle at which the display portion 40 performs display processes based on image data becomes synchronized with twice the sensor cycle.

Specifically, in this embodiment, when any delay in preparation for display does not exist, the display portion 40 operates as shown in FIG. 2, and the length of the period $T_{DV}$ from the timing point $t_1$ at which a vertical synchronization signal $DV_{sync}$ is output until the timing point $t_4$ at which a subsequent vertical synchronization signal $DV_{sync}$ is output is 1/60 seconds. Thus, in this state, the display cycle of the display portion 40 is equal to the length of the period $T_{DV}$ and is synchronized with a cycle that is twice the sensor cycle $T_{SV}$ (1/120 seconds) of the image sensor 15.

Meanwhile, for example, as shown in FIG. 4, when a delay in preparation for display due to an incidental cause or the like has occurred, any vertical synchronization signal $DV_{sync}$ is not output at the timing point $T_1$ at which, in a normal state, a vertical synchronization signal $DV_{sync}$ is to be output in order to start display processes corresponding to the x-th frame. Further, as shown in FIG. 4, when the delay in preparation for display is gradually absorbed in the course in which the display portion 40 performs display processes during a plurality of display cycles, any vertical synchronization signal $DV_{sync}$ is not output at the timing point $t_4$ (refer to FIG. 2) at which a vertical synchronization signal $DV_{sync}$ is to be output in order to start display processes corresponding to the next (x+1)th frame, and the vertical synchronization signal $DV_{sync}$ is output at the timing point $t_5$. Further, the length of a period TAS between vertical synchronization signals $DV_{sync}$ each of which is output at a corresponding one of a display start time point and a display end time point of the x-th frame is shorter than the length of the period $T_{DV}$, which is 1/60 seconds that is twice the sensor cycle $T_{SV}$. Accordingly, when focusing attention on a vertical synchronization signal $DV_{sync}$ that is output to start display processes corresponding to the (x+1)th frame, the sensor cycle of the image sensor 15 and the display cycle of the display portion 40 are not synchronized with each other.

Moreover, however, when focusing attention on the timing point $t_6$ at which a vertical synchronization signal $DV_{sync}$ is output in order to start display processes corresponding to the next (x+2)th frame, the length of a period from the timing point $t_1$ until the timing point $t_6$ is just equal to twice the length of the period $T_{DV}$. Accordingly, when focusing attention on a vertical synchronization signal $DV_{sync}$ that is output in order to start display processes corresponding to the (x+2) frame, the sensor cycle of the image sensor 15 and the display cycle of the display portion 40 are synchronized with each other.

In addition, as shown in FIGS. 3 and 5, when the delay in preparation for display is absorbed in the course in which the display portion 40 performs display processes during one display cycle, the sensor cycle of the image sensor 15 and the display cycle of the display portion 40 become synchronized with each other without any occurrence of a period during which these cycles are not synchronized with each other. That is, in the example shown in FIG. 3, a period between the timing point $t_1$ at which a vertical synchronization signal $DV_{sync}$ corresponding to the x-th frame is to be output and the timing point $t_3$ at which a vertical synchronization signal $DV_{sync}$ corresponding to the (x+1)th frame is output is the same as the period $T_{DV}$ whose length is 1/60 seconds that is twice the sensor cycle $T_{SV}$. Further, in the example shown in FIG. 5, a period between the timing point $t_1$ at which a vertical synchronization signal $DV_{sync}$ corresponding to the x-th frame is to be output and the timing point $t_4$ at which a vertical synchronization signal $DV_{sync}$ corresponding to the (x+1)th frame is output is the same as the period $T_{DV}$ whose length is 1/60 seconds that is twice the sensor cycle $T_{SV}$. Accordingly, in these examples, the sensor cycle of the image sensor 15 and the display cycle of the display portion 40 become synchronized with each other without any occurrence of a period during which these cycles are not synchronized with each other.

Further, the imaging device 1 according to this embodiment can be deemed as an imaging device including the image sensor 15 that captures an object at intervals of a predetermined sensor cycle and the display portion 40 that displays an image on the basis of output data from the image sensor 15, and in the relevant imaging device, a display cycle of the display of the image is N times the sensor cycle (N being an integer larger than or equal to "2") and a length of a display scanning period during which the display portion 40 performs a display process on each of lines existing between a display start line and a display end line is shorter than a length of a display scanning period for the display cycle that is N times the sensor cycle. For example, as shown in FIG. 2, the length of the period $T_{DV}$ that is the display cycle of the display of the image by the display portion 40 is twice the sensor cycle $T_{SV}$, but, in this embodiment, because of the provision of the margin ΔM, the length of a display scanning period during which the data active signal $DD_{active}$ is active is shorter than the length of a display scanning period for the display cycle that is twice the sensor cycle $T_{SV}$. Thus, this embodiment is an example of an imaging device in which, at least after the synchronization, a display cycle of the display of the image by the display portion 40 is twice a sensor cycle and the length of a display scanning period for the display of the image is shorter than that of a display scanning period for the display cycle which is twice the sensor cycle.

Further, the imaging device 1 according to this embodiment can be deemed as an imaging device which includes the image sensor 15 for capturing an object at intervals of a predetermined senor cycle and the display portion 40 for displaying an image on the basis of output data from the image sensor 15, and in which, when a certain operation is performed by a user, the display portion displays the image at each of intervals of a display cycle that is shorter than N times the sensor cycle (N being an integer larger than or equal to "2"), and thereafter, the display portion displays the image at each of intervals of a display cycle that is N times the sensor cycle.

That is, the delay in preparation for display occurs due to a delay in image processing in the image data generation portion 20, the delay in the image processing occurs due to various causes. For example, the delay in the image processing sometimes occurs due to a specific image process, such as a distortion aberration correction, a focus adjustment, or a white balance adjustment. Further, the image process that becomes a cause of a display delay is likely to be executed when a user performs a specific operation. For example, the distortion abbreviation correction is likely to be made when a user performs an operation for changing a focal length by driving the lens 11 through the use of a zoom ring of the imaging device 1. That is, when the focal length is changed, a range of the formation of an object image on the image sensor 15 varies and, as a result, the degree of the distortion varies. When such a variation of the degree of the distortion occurs, the distortion aberration correction is made by the image data generation portion 20. Further, as a result, the number of lines for use in generation of image data for one display line varies and, as a result, an image processing speed per line is likely to vary before and after the change of the focal length.

When an auto-focus adjustment is performed, output data from the image sensor 15 or image data generated from the output data is acquired for execution of the auto-focus adjustment, and is used in a determination as to whether or not focusing is achieved. Thus, when the auto-focus adjustment is performed, a large portion of each of resources, such as memory-to-memory transmission bandwidth and arithmetic capacity, inside the imaging device 1 is temporarily used. As a result, processing for generating image data in the image data generation portion 20 is delayed and a delay in preparation for display is likely to occur. The same situation is likely to occur in any image process, such as the white balance adjustment, and the delay in preparation for display is likely to occur when any one of the specific image processes is performed.

The distortion abbreviation correction is likely to be made when a user has performed an operation for driving the lens 11 through the use of the zoom ring of the imaging device 1 and an operation for instructing execution of the change of a focal length through the use of a focal-length change instructing portion. Further, the auto-focus adjustment is executed when a user has performed an operation for instructing execution of a focusing operation by halfway pressing down the shutter button of the operation portion 55. Moreover, the white balance adjustment is likely to be executed when a user has rapidly performed an operation for changing a direction in which the imaging device 1 faces. Further, when a delay in preparation for display has occurred due to any one of these image processes, the display portion 40 temporarily displays images at intervals of a display cycle that is shorter than N times the sensor cycle, and shortly thereafter, the delay is absorbed. Thus, when any delay in preparation for display does not occur and operation comes into a stable state thereafter, the display portion 40 is capable of displaying images at intervals of the display cycle that is N times the sensor cycle.

For example, as shown in FIG. 4, even when, during the x-th frame, because of an operator's operation such as the operation of the zoom ring, a display cycle becomes the period $T_{As}$ and a state in which the sensor cycle $T_{SV}$ and a display cycle of the display portion 40 are not synchronized with each other has occurred, when the (x+1)th frame is also taken into consideration, it is possible to deem that the sensor cycle $T_{SV}$ of the image sensor 15 and the display cycle of the display portion 40 are synchronized with each other at the timing point $t_6$ at which a subsequent vertical synchronization signal $DV_{sync}$ is output. Accordingly, the imaging device 1 according to this embodiment can be deemed as an imaging device in which, when a certain operation is performed by a user, the display cycle of the display portion 40 becomes short in an initial frame and then gradually converges to a display cycle that is N times the sensor cycle.

In addition, this embodiment can be also deemed as an imaging device that includes the image sensor 15 for imaging an object at intervals of a predetermined senor cycle and the display portion 40 for displaying an image on the basis of output data from the image sensor 15, and that displays the image at each of intervals of a display cycle that is shorter than N times the sensor cycle (N being an integer larger than or equal to "2") when a speed of generation of the image data is lower than a normal speed, and displays the image at each of intervals of a display cycle that is equal to N times the sensor cycle when the speed of generation of the image data is the normal speed.

Other Embodiments

The above embodiment is just one of practice examples of the invention, and other various embodiments can be employed as far as a configuration in which the display of partial images corresponding to one frame is started when a partial image corresponding to a predetermined line has become ready for being displayed is implemented therein. For example, the predetermined line is not limited to a first line, but may be any other line.

Further, in addition to a configuration in which the margin ΔM is provided in any one of a portion anterior to, and a portion posterior to, a front porch that is provided at the front side of the vertical synchronization signal $DV_{sync}$, various configurations can be employed. For example, the margin ΔM may be provided in any one of a portion anterior to, and a portion posterior to, a back porch that is provided at the back side of the vertical synchronization signal $DV_{sync}$; and the margin ΔM may be provided in any one of a portion anterior to, or a portion posterior to, a front porch or a back porch for the horizontal synchronization signal $DH_{sync}$. In a configuration in which the horizontal synchronization periods are formed at constant timing points, the length of the margin ΔM may be configured so as to be variable by enabling or disabling a horizontal synchronization period that constitutes the relevant horizontal synchronization periods and that is formed at any one of the timing points. This configuration can be realized by implementing a configuration in which display processes within any one of vertical synchronization periods can be enabled or disabled by turning on/off of a data enable signal, or the like.

Further, as the image processing performed by the image data generation portion 20, various processing can be supposed. A configuration in which any one or ones of the aforementioned processes, such as the interpolation process, are performed may be implemented or a configuration in which one or more processes other than aforementioned processes are performed may be implemented. Further, a post-synchronization display cycle of the display portion 40 is not limited to ⅟60 seconds and ⅟120 seconds, and any display cycle that is N times the sensor cycle of the image sensor 15 is enough as the post-synchronization display cycle of the display portion 40.

Further, in the aforementioned embodiment, image data corresponding to four frames can be accumulated, but, naturally, image data corresponding to a smaller number of frames or a larger number of frames may be able to be accumulated. Further, as a method for defining the line progress information, various methods can be employed. A method in which the line progress information is defined by using information indicating the number of lines within one frame and information indicating the number of frames for each of which imaging has been completed may be employed; and a method in which the line progress information is defined by using information indicating the number of lines within one frame and information indicating a remainder number resulting from dividing the number of frames by N may be employed.

Further, in the aforementioned embodiment, the image sensor 15 starts the output of the output data corresponding to one frame in response to a vertical synchronization signal $SV_{sync}$, but the output of the output data may be made once every N vertical synchronization signals $SV_{sync}$.

Further, the display portion 40 is not limited to the EVF, and may be a liquid crystal display mounted on the back face of the imaging device 1, or the like. Further, an imaging device according to an aspect of the invention is not limited to a still camera, and may be a movie camera, or may be an imaging device, a head-up display, or the like, that is mounted in devices different from such cameras, such as a vehicle. Naturally, an imaging device according to an aspect of the invention may be an imaging device that is used as binoculars, a telescope, a microscope, or the like. Further, the display portion 40 may be an organic light-emitting diode (OLED) or a display portion in a projector, in addition to the liquid crystal display.

This application claims priority to Japan Patent Application No. 2015-044366 filed Mar. 6, 2015, the entire disclosures of which are hereby incorporated by reference in their entireties.

What is claimed is:

1. An imaging device comprising:
   an image sensor that performs imaging operations at intervals of a predetermined sensor cycle;
   an image data generation portion that generates image data on the basis of output data from the image sensor;
   a display portion that displays an image represented by the image data within a second display scanning period whose length is shorter than a length of a first display scanning period corresponding to a display cycle that is N times the sensor cycle (N being an integer larger than or equal to "2"); and
   a display control portion that controls the display portion to display the image at a rate of once every N iterations of the imaging operation by the image sensor.

2. The imaging device according to claim 1, wherein the display portion displays the image represented by the image data within the second display scanning period whose length is between a length of a third display scanning period corresponding to a display cycle that is (N−1) times the sensor period and the length of the first display scanning period.

3. The imaging device according to claim 1, wherein, when a partial image data, that constitutes the image data and represents a partial image corresponding to a predetermined one of lines forming the image, has been generated, the display control portion outputs a vertical synchronization signal to the display portion, and in response to the vertical synchronization signal, the display portion starts display of one frame of the image.

4. The imaging device according to claim 1, wherein the display control portion acquires progress information that indicates progress of a process of generating partial image data constituting the image data, and causes the display portion to display a partial image constituting the image whose the process of generating partial image data has been completed on the basis of the progress information.

5. A method of controlling an imaging device including
   an image sensor that performs imaging operations at intervals of a predetermined sensor cycle, and
   a display portion that displays an image on the basis of output data from the image sensor,
   the method comprising
   controlling the display portion to display the image within a second display scanning period whose length is shorter than a length of a first display scanning period corresponding to a display cycle that is N times the sensor cycle (N being an integer larger than or equal to "2").

6. A method of controlling an imaging device including
   an image sensor that performs imaging operations at intervals of a predetermined sensor cycle, and
   a display portion that displays an image on the basis of output data from the image sensor,
   the method comprising:
   when a predetermined operation is performed by a user, controlling the display portion to display the image at each of intervals of a display cycle that is shorter than N times the sensor cycle (N being an integer larger than or equal to "2"); and
   thereafter, controlling the display portion to display the image at each of intervals of a display cycle that is N times the sensor cycle.

* * * * *